(12) United States Patent
Araki

(10) Patent No.: US 9,285,880 B2
(45) Date of Patent: Mar. 15, 2016

(54) TOUCH PANEL DEVICE AND METHOD OF CONTROLLING A TOUCH PANEL DEVICE

(71) Applicant: Panasonic Corporation, Osaka (JP)

(72) Inventor: Shoichi Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 13/803,425

(22) Filed: Mar. 14, 2013

(65) Prior Publication Data
US 2014/0176455 A1 Jun. 26, 2014

Related U.S. Application Data

(60) Provisional application No. 61/745,850, filed on Dec. 26, 2012.

(51) Int. Cl.
| | |
|---|---|
| *G06F 3/041* | (2006.01) |
| *G06F 3/01* | (2006.01) |
| *G06F 3/0488* | (2013.01) |

(52) U.S. Cl.
CPC .............. *G06F 3/016* (2013.01); *G06F 3/041* (2013.01); *G06F 3/0488* (2013.01); *G06F 2203/014* (2013.01); *G06F 2203/04808* (2013.01)

(58) Field of Classification Search
None
See application file for complete search history.

(56) References Cited

U.S. PATENT DOCUMENTS

| 7,843,427 | B2* | 11/2010 | Ording | G06F 3/04812 345/157 |
|---|---|---|---|---|
| 8,098,235 | B2 | 1/2012 | Heubel et al. | |
| 8,451,245 | B2 | 5/2013 | Heubel et al. | |
| 8,451,248 | B1* | 5/2013 | Kim | G06F 3/016 341/27 |
| 8,665,227 | B2* | 3/2014 | Gunawan | 345/173 |
| 8,836,663 | B2* | 9/2014 | Kim | G06F 3/016 345/173 |
| 2004/0174387 | A1* | 9/2004 | Nonaka | G01C 21/367 345/684 |

(Continued)

FOREIGN PATENT DOCUMENTS

| JP | 2000-105129 | 4/2000 |
|---|---|---|
| JP | 2002-236543 | 8/2002 |

(Continued)

OTHER PUBLICATIONS

International Search Report issued Jul. 2, 2013 in International (PCT) Application No. PCT/JP2013/002076.

*Primary Examiner* — Dismery Mercedes
(74) *Attorney, Agent, or Firm* — Wenderoth, Lind & Ponack, L.L.P.

(57) ABSTRACT

An apparatus including: a panel; actuators; a movement input determining unit which calculates movement directions and distances of touch positions, based on time-series information of the touch positions; a display unit; a direction determining unit which determines a direction of an object included in the content item with respect to the display unit; a vibration position determining unit which determines a first touch position closer/closest to the object and one or more second touch positions detected simultaneously; a vibration determining unit which determines a tactile feedback signal presenting a vibration for the first touch position, based on the object direction; a multi-point simultaneous vibration control unit which performs control for presenting the vibration at the first touch position and not presenting the vibration at the second touch positions; and a content control unit which enables display of the content item by scrolling it based on the movement directions and distances.

12 Claims, 20 Drawing Sheets

(56) References Cited

U.S. PATENT DOCUMENTS

| | | | |
|---|---|---|---|
| 2009/0085878 A1 | 4/2009 | Heubel et al. | |
| 2009/0167704 A1* | 7/2009 | Terlizzi | G06F 3/016 345/173 |
| 2010/0156818 A1* | 6/2010 | Burrough | G06F 3/016 345/173 |
| 2010/0267424 A1* | 10/2010 | Kim et al. | 455/566 |
| 2011/0072345 A1* | 3/2011 | Lim | G06F 3/016 715/702 |
| 2011/0285667 A1* | 11/2011 | Poupyrev et al. | 345/174 |
| 2012/0081326 A1 | 4/2012 | Heubel et al. | |
| 2012/0081327 A1 | 4/2012 | Heubel et al. | |
| 2013/0002560 A1* | 1/2013 | Chen | G06F 3/0416 345/168 |
| 2014/0055367 A1* | 2/2014 | Dearman | G06F 3/0488 345/173 |

FOREIGN PATENT DOCUMENTS

| | | |
|---|---|---|
| JP | 2003-058321 | 2/2003 |
| JP | 2004-226266 | 8/2004 |
| JP | 2004-309962 | 11/2004 |
| JP | 3888099 | 2/2007 |
| JP | 2010-541071 | 12/2010 |
| JP | 2011-150467 | 8/2011 |
| WO | 2009/042424 | 4/2009 |

* cited by examiner

FIG. 6

| Control pattern | The number of touches | Movement direction | Movement distance | Stoppage time | Display control |
|---|---|---|---|---|---|
| [1] | 1 | v1 | d1 | NULL | Movement distance Scroll $L^o + v1$ |
| [2] | 1 | v1 | D or more | $T^s$ or more | Sequential scroll $L^o + \alpha v1$ |
| [3] | 2 | v1 or v2 when v1 and v2 are the same | d1 or d2 | NULL | Movement distance Scroll $L^o + v1$ or $L^o + v2$ |
| [4] | 2 | v1 or v2 when v1 and v2 are the same | D or more | $T^s$ or more | Sequential scroll $L^o + \alpha v1$ or $L^o + \alpha v2$ |

TOUCH PANEL DEVICE AND METHOD OF CONTROLLING A TOUCH PANEL DEVICE

CROSS REFERENCE TO RELATED APPLICATION

The present application claims the benefit of U.S. Provisional Patent Application No. 61/745,850 filed on Dec. 26, 2012. The entire disclosure of the above-identified application, including the specification, drawings and claims is incorporated herein by reference in its entirety.

FIELD

The present disclosure relates to apparatuses each for outputting, for a user of a touch panel, a direction in which an object such as a Graphical User Interface (GUI) operable by touch input is present, by vibrating the touch panel. In particular, the present disclosure relates to a tactile/haptic feedback touch panel apparatus which includes a multi-touch panel capable of simultaneously detecting a plurality of touch positions touched with plural fingers, and which presents a user with a direction in which an object such as a GUI is present by simultaneously presenting different vibrations to the respective fingers.

BACKGROUND

Recently, one or more touch panels and touch pads are mounted onto each of various kinds of apparatuses such as smart phones, tablets, car navigation systems, personal computers, gaming machines, ATMs, ticket vending machines etc. Such an apparatus including one or more touch panels displays an object such as a GUI for operation on a display screen, allowing a user to operate the object by checking the position of the GUI by sight and touching the GUI.

In addition, a smart phone or a tablet includes a multi-touch panel capable of simultaneously detecting a plurality of touch positions touched with plural fingers, and therewith allows practical intuitive operations for enlarging, shrinking, rotating, etc. of the object according to movements of the touch positions. Touch panels mounted on the aforementioned touch panel apparatuses do not have any mechanical button switch and thus do not generally provide any tactile/haptic feedback obtainable in response to a press of a mechanical button switch when the object such as the GUI is operated. For this reason, some techniques have been made practical each of which is for allowing a user to recognize a result of the acceptance of an operation by vibrating a touch panel when an object is operated.

However, the techniques each for allowing the check of the operation result by the vibration has a problem of being incapable of presenting the location of a GUI to be operated next.

In view of the aforementioned problem, Patent Literature 1 discloses a technique for guiding a finger touching a touch panel to the predetermined position of a button displayed on a display screen using a predetermined vibration pattern for guiding the finger in the vertical direction and/or horizontal direction of the display screen.

CITATION LIST

Patent Literature

Japanese Patent No. 3888099

SUMMARY

Technical Problem

The technique in Patent Literature 1 makes it possible to notify a user of, for example, information about the button to be operated next by guiding the finger touching the touch panel to the predetermined position of the button displayed on the display screen using the predetermined vibration pattern in the vertical direction and/or horizontal direction of the display screen.

However, the Inventors have found a problem of the technique in Patent Literature 1 that, since the technique in Patent Literature 1 employs a scheme for guiding the finger to the position of the button using the predetermined vibration pattern in the vertical direction and/or horizontal direction of the display screen, the technique does not allow easy input operations by smooth finger movements because (i) a direction in which the skin of the finger is transformed in a movement by sliding by the finger on the touch panel toward the direction in which the GUI is present and (ii) a direction in which the skin of the finger is transformed by a vibration for guiding the finger to the position of the button are opposite, and thus the movement of the finger is hampered.

In view of this, the present disclosure provides a tactile/haptic feedback touch panel apparatus which makes it possible to present a direction in which a target GUI is present, based on a positional relationship between (i) a touch position, among touch positions simultaneously touched and detected on a multi-touch panel, which is closer/closest to the target GUI and at which a vibration is presented, and (ii) the other touch position(s) at which the vibration is not presented, without guiding the finger in the vertical direction and/or horizontal direction of the display screen of the panel. Furthermore, the present disclosure provides a tactile/haptic feedback touch panel apparatus capable of, for example, presenting a user with the direction which is outside a display area of the display screen and in which focused information is present in the case where the focused information gone outside the display area when an object such as an electric map and an electric document is enlarged, shrunk, or scrolled.

Solution to Problem

A tactile/haptic feedback touch panel apparatus according to an aspect of the present disclosure includes: a panel configured to receive touch input by a user and output a vibration notifying acceptance of the touch input; a plurality of actuators which are arranged at different positions on the panel and vibrate the panel; a touch information obtaining unit configured to obtain touch positions detected simultaneously at the different positions on the panel; a movement input determining unit configured to calculate movement directions and movement distances of the touch positions detected simultaneously on the panel, based on time-series information of the touch positions; a display unit configured to display a content item; a direction determining unit configured to determine an object direction of an object included in the content item when the object is present outside the display area of the display unit; a vibration position determining unit configured to compare a position of the object and each of the touch positions, and determine (i) a touch position closest to the object as a first touch position at which a predetermined vibration is presented and (ii) each of one or more touch positions detected simultaneously with the first touch position and as a second touch position at which the predetermined vibration is not presented; a vibration determining unit configured to determine a tactile feedback signal presenting a vibration to be presented at the first touch position determined by the vibration position determining unit, based on the object direction determined by the direction determining unit; a multi-point simultaneous vibration control unit configured to calculate a driving signal for causing each of the actuators to present the predetermined vibration at the first touch position and a driving signal for preventing each of the actuators from presenting the predetermined vibration at the second touch position, and simultaneously perform vibration control adapted to the respective touch positions on the panel by driving the actuators using the calculated driving signals; and a content control unit configured to perform display control for displaying the content item onto the display unit by scrolling the content based on the movement directions and the movement distances of the touch positions calculated by the movement input determining unit.

This general aspect may be implemented using a system, an apparatus, an integrated circuit, a computer program, or a computer-readable recording medium such as a CD-ROM, or any combination of systems, apparatuses, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The tactile/haptic feedback touch panel apparatus according to an aspect of the present disclosure provides an advantageous effect of allowing a user to appropriately check the direction in which a target GUI is present by controlling whether or not to present a vibration at each of touch positions touched by the user.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1A is a block diagram of a structure of a tactile/haptic feedback touch panel apparatus according to Embodiment 1 of the present disclosure.

FIG. 1B is an illustration of operations and display by a tablet device according to Embodiment 1 of the present disclosure.

FIG. 2 is an illustration of a structure of a tactile/haptic feedback touch panel apparatus according to Embodiment 1 of the present disclosure.

FIG. 3A is an illustration showing examples of a content item, touch input for operating object positions, and a vibration position on the panel.

FIG. 3B is an illustration showing examples of a content item, touch input for operating object positions, and a vibration position on the panel.

FIG. 3C is an illustration showing examples of a content item, touch input for operating object positions, and a vibration position on the panel.

FIG. 4A is an illustration of an example of a tactile feedback signal.

FIG. 4B is an illustration of an example of a tactile feedback signal.

FIG. 5 is a flowchart of operations performed by the tactile/haptic feedback touch panel apparatus according to Embodiment 1 of the present disclosure.

[FIG. 6]

FIG. 6 is a diagram showing examples of content control patterns.

FIG. 7A is composed of exemplary illustrations each showing a presentation direction in the case of three-point touches.

FIG. 7B is composed of exemplary illustrations showing, as a whole, presentation of eight directions in the case of three-point touches.

FIG. 8 is a block diagram of an exemplary structure of a multi-point simultaneous vibration control unit according to Embodiment 1 of the present disclosure.

FIG. 9 is an illustration showing paths through each of which a vibration is communicated from an actuator to a certain position on the panel.

FIG. 10A is an illustration of an example of a TSP.

FIG. 10B is an illustration of an example of a TSP response.

FIG. 10C is an illustration of an example of an inverse function of the TSP.

FIG. 10D is an illustration of an example of an impulse response calculated from the TSP response.

FIG. 11 is a flowchart of operations performed by the multi-point simultaneous vibration control unit according to Embodiment 1 of the present disclosure.

FIG. 12 is an illustration for explaining processing operations performed by the multi-point simultaneous vibration control unit according to Embodiment 1 of the present disclosure.

FIG. 13 is an illustration of examples of filters.

FIG. 14 is an illustration of examples of driving signals.

FIG. 15 is an illustration showing experimental results of vibrations at the touch positions on the panel.

Figure 1A:
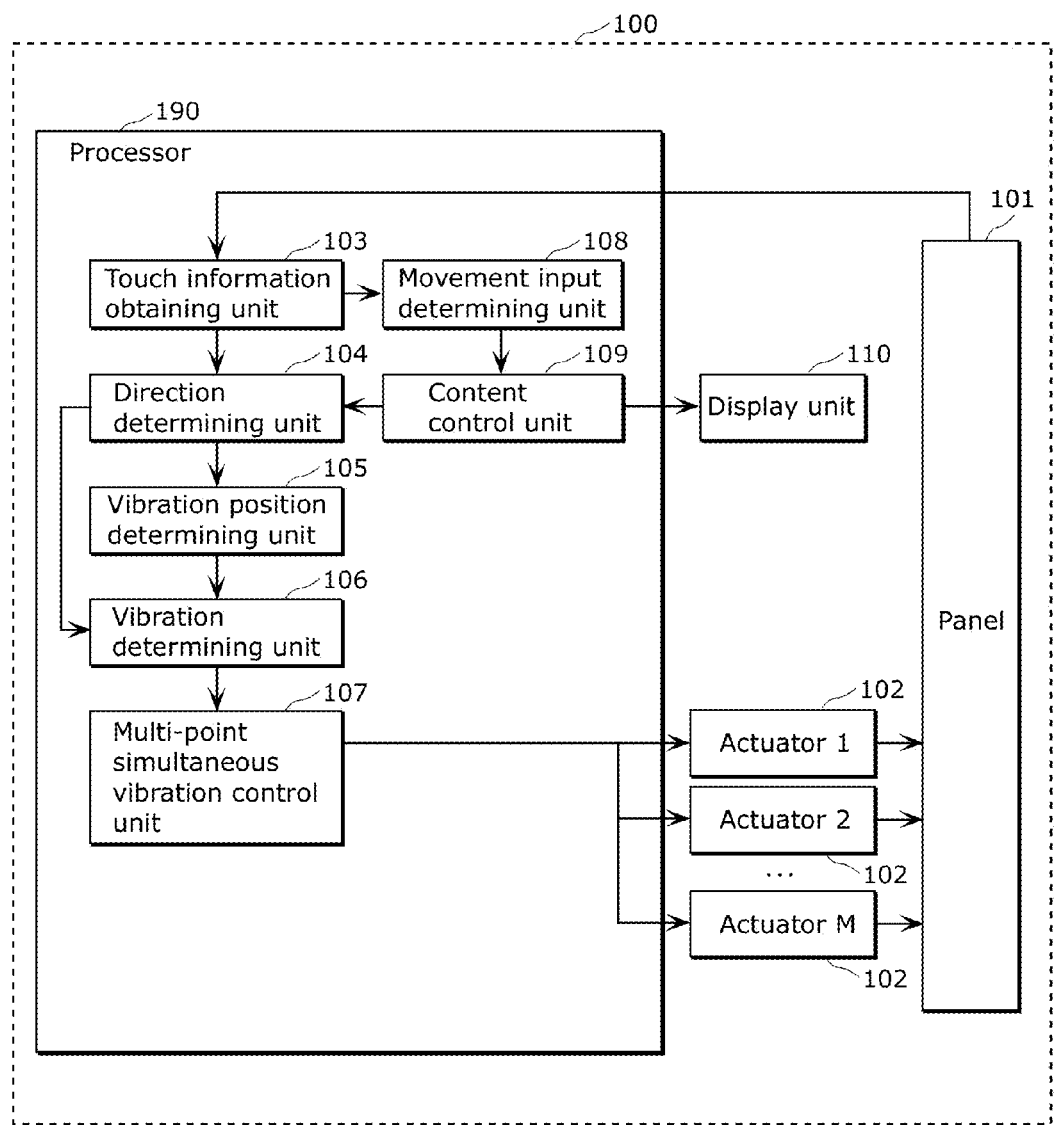
[FIG. 1A]

DESCRIPTION OF EMBODIMENTS (Underlying Knowledge Forming Basis of the Present Disclosure)

However, the Inventors have found a problem of the technique disclosed in Patent Literature 1 that, since the technique in Patent Literature 1 employs a scheme for guiding the finger to the position of the button using the predetermined vibration pattern in the vertical direction and/or horizontal direction of the display screen, the technique does not allow easy input operations by smooth finger movement because (i) a direction in which the skin of the finger is transformed in a movement by sliding the finger on the touch panel toward the direction in which the GUI is present and (ii) a direction in which the skin of the finger is transformed by a vibration for guiding the finger to the position of the button are opposite and thus the movement of the finger is hampered.

In view of this, the present disclosure provides a tactile/haptic feedback touch panel apparatus which makes it possible to present a direction in which a target GUI is present, based on a positional relationship between (i) a touch position, among touch positions simultaneously touched and detected on a multi-touch panel, which is closer/closest to the target GUI and at which a vibration is presented, and (ii) the other touch position(s) at which the vibration is not presented, without guiding the finger in the vertical and/or horizontal direction of the display screen of the panel. More specifically, the present disclosure provides the tactile/haptic feedback touch panel apparatus which presents the direction in which the object is present in the following manner: by presenting a vibration of a first tactile feedback signal at the left touch position among two touch positions when the object is present to the left of the display area on the display screen; by presenting a vibration of a first tactile feedback signal at the right touch position among two touch positions when the object is present to the right of the display area on the display screen; by presenting a vibration of a second tactile feedback signal at the upper touch position among two touch positions when the object is present above the display area on the display screen; and by presenting a vibration of a second tactile feedback signal at the lower touch position among two touch positions when the object is present below the display area on the display screen.

Furthermore, the present disclosure provides a touch panel device capable of, for example, presenting, to a user, the direction which is outside a display area on the display screen and in which focused information is present in the case where the focused information gone outside the display area when an object such as an electric map and an electric document is enlarged, shrunk, or scrolled, and provides a method of controlling a touch panel device. The present disclosure also provides a tactile/haptic feedback touch panel apparatus or a tactile/haptic user interface apparatus, a method of controlling a tactile/haptic feedback touch panel apparatus, and a vibration method for a tactile/haptic feedback touch panel apparatus.

A method of controlling a touch panel device according to an aspect of the present disclosure includes: detecting a plurality of inputs provided by multi-touch input at or around positions on a surface of the touch panel; detecting a plurality of input positions of the detected inputs; displaying a part or all of a content item onto a display screen; determining whether an object included in the content item is present within a display area of the display screen or outside the display area; and when the object is present outside the display area, presenting a predetermined vibration at an input position at or around at least one position including an input position closest to the object among the input positions, and performing control for not presenting the predetermined vibration at the one or more input positions on the display screen other than the input position at or around the at least one position among the input positions.

With this, it is possible to appropriately notify the user of the object direction by performing control for presenting the predetermined vibration at each of one or more of the positions touched by the user.

The touch panel device control method according to the aspect of the present disclosure includes performing one of different vibration methods according to a distance between the object and the input position closest to the object.

With this, it is possible to appropriately notify the user of the object direction by performing control for presenting the predetermined vibration at each of one or more of the positions touched by the user.

The touch panel device control method according to the aspect of the present disclosure includes causing the touch panel device to scroll the content item in response to sliding or tapping by a user and vibrate the touch panel when the object enters the display area from outside the display area.

With this, the tactile feedback allows the user to recognize the entrance of the object into the display area.

The touch panel device control method according to the aspect of the present disclosure includes selectively performing different vibration methods for when the object present outside the display area is in a left or right direction with respect to the display area and when the object present outside the display area is in an upper or lower direction with respect to the display area.

With this, it is possible to appropriately notify the user of the object direction from among the upper or lower direction and the left or right direction.

A touch panel device according to an aspect of the present disclosure includes: a touch panel for multi-touch input; a plurality of actuators; and a processor, wherein the processor: detects a plurality of inputs provided by multi-touch input at or around positions on a surface of the touch panel; detects a plurality of input positions of the detected inputs; displays a part or all of a content item onto a display screen; determines whether an object included in the content item is present within a display area of the display screen or outside the display area; and when the object is present outside the display area, presents a predetermined vibration at a position at or around at least one position including an input position closest to the object, among the input positions; and performs control for not presenting the predetermined vibration at the one or more input positions on the display screen other than the input position at or around the at least one position among the input positions.

With this, it is possible to appropriately notify the user of the object direction performing control for presenting the predetermined vibration at each of one or more of the positions touched by the user.

The touch panel device according to the aspect of the present disclosure selectively performs different vibration methods according to a distance between the object and the input position closest to the object.

With this, it is possible to appropriately notify the user of the object direction by performing control for presenting the predetermined vibration at each of one or more of the positions touched by the user.

The touch panel device according to the aspect of the present disclosure is the touch panel device defined in Claim 1 scrolls the content item in response to sliding or tapping by a user, and vibrates the touch panel when the object enters the display area from outside the display area.

With this, the tactile feedback allows the user to recognize the entrance of the object into the display area.

The touch panel device according to the aspect of the present disclosure selectively performs different vibration methods for when the object present outside the display area is in a left or right direction with respect to the display area and when the object present outside the display area is in an upper or lower direction with respect to the display area.

With this, it is possible to appropriately notify the user of the object direction from among the upper or lower direction and the left or right direction.

The touch panel device according to the aspect of the present disclosure is a touch panel device for use in a car, and a content item is a map.

With this, it is possible to appropriately notify the user of the object direction on the map by performing control for presenting the predetermined vibration at each of one or more of the positions touched by the user.

In the touch panel device according to the aspect of the present disclosure, the content item is a map, an electric document, a bookmark, or a Web page.

With this, it is possible to appropriately notify the user of the object direction on the map, electric document, bookmark, or a Web page by performing control for presenting the predetermined vibration at each of one or more of the positions touched by the user.

A tactile/haptic feedback touch panel apparatus according to an aspect of the present disclosure includes: a panel configured to receive touch input by a user and output a predetermined vibration notifying acceptance of the touch input; a plurality of actuators which are arranged at different positions on the panel and vibrate the panel; a touch information obtaining unit configured to obtain touch positions detected simultaneously at the different positions on the panel; a movement input determining unit configured to calculate movement directions and movement distances of the touch positions detected simultaneously on the panel, based on time-series information of the touch positions; a display unit configured to display a content item; a direction determining unit configured to determine an object direction of an object included in the content item when the object is present outside the display area of the display unit; a vibration position determining unit configured to compare a position of the object and each of the touch positions, and determine (i) a touch position closest to the object as a first touch position at which a predetermined vibration is presented and (ii) each of one or more touch positions detected simultaneously with the first touch position and as a second touch position at which the predetermined vibration is not presented; a vibration determining unit configured to determine a tactile feedback signal presenting the predetermined vibration to be presented at the first touch position determined by the vibration position determining unit, based on the object direction determined by the direction determining unit; a multi-point simultaneous vibration control unit configured to calculate a driving signal for causing each of the actuators to present the predetermined vibration at the first touch position and a driving signal for preventing each of the actuators from presenting the predetermined vibration at the second touch position, and simultaneously perform vibration control adapted to the respective touch positions on the panel by driving the actuators using the calculated driving signals; and a content control unit configured to perform display control for displaying the content item onto the display unit by scrolling the content item based on the movement directions and the movement distances of the touch positions calculated by the movement input determining unit.

With this, it is possible to appropriately notify the user of the object direction by performing control for presenting the predetermined vibration at each of one or more of the positions touched by the user. In addition, it is possible to efficiently perform the operation for making a movement on the content item so as to re-display the object within the display area.

A method performed by a tactile/haptic feedback touch panel apparatus and according to an aspect of the present disclosure allows each of a plurality of actuators in the apparatus to output a predetermined vibration in response to touch input by a user on a panel in the apparatus, and the method includes: obtaining a plurality of touch positions detected simultaneously at different positions on the panel: calculating movement directions and movement distances of the touch positions detected simultaneously on the panel, based on time-series information of the touch positions; displaying a content item; determining an object direction of an object in the content item when the object is present outside the display area of the display unit; determining, among the plurality of touch positions, (i) a touch position closest to the object as a first touch position at which the predetermined vibration is presented and (ii) each of the other one or more touch positions detected simultaneously with the first touch position and as a second touch position at which the predetermined vibration is not presented; determining a tactile feedback signal representing the predetermined vibration to be presented at the determined first touch position, based on the object direction determined by the direction determining unit; driving the actuators so that each of the actuators presents the predetermined vibration at the first touch position, and each of the actuators does not present the predetermined vibration at the second touch position; and displaying the content item onto the display unit by scrolling the content item based on the calculated movement directions and movement distances.

With this, it is possible to appropriately notify the user of the object direction by performing control for presenting the predetermined vibration at each of one or more of the positions touched by the user. In addition, it is possible to efficiently perform the operation for making a movement on the content item so as to re-display the object within the display area.

A non-transitory computer-readable storage media according to an aspect of the present disclosure stores one or more programs each of which includes one or more instructions. When the program is executed by an electric device including a touch panel, the program causing the electric device to execute: detecting a plurality of inputs provided by multi-touch input at or around positions on a surface of the touch panel; detecting a plurality of input positions of the detected inputs; displaying a part or all of a content item onto a display screen; determining whether an object included in the content item is present within a display area of the display screen or outside the display area; and when the object is present outside the display area, presenting a predetermined vibration at an input position at or around at least one position including an input position closest to the object among the input positions, and performing control for not presenting the predetermined vibration at the one or more input positions on the display screen other than the input position at or around the at least one position among the input positions.

With this, it is possible to appropriately notify the user of the object direction by performing control for presenting the predetermined vibration at each of one or more of the positions touched by the user.

A non-transitory computer-readable storage media according to an aspect in the present disclosure stores one or more programs each of which includes one or more instructions. When the program is executed by an electric device including a touch panel for touch input, the program causing the electric device to execute: obtaining a plurality of touch positions detected simultaneously at different positions on the panel after touches are input by a user: calculating movement directions and movement distances of the touch positions detected simultaneously on the panel, based on time-series information of the touch positions; displaying a content item; determining an object direction of an object in the content item when the object is present outside the display area of the display unit; determining, among the plurality of touch positions, (i) a touch position closest to the object as a first touch position at which a predetermined vibration is presented and (ii) each of the other one or more touch positions detected simultaneously with the first touch position and as a second touch position at which the predetermined vibration is not presented; determining a tactile feedback signal representing a predetermined vibration to be presented at the determined first touch position, based on the object direction determined by the direction determining unit; driving the actuators so that each of the actuators presents the predetermined vibration at the first touch position, and each of the actuators does not present the predetermined vibration at the first touch position; and displaying the content item onto the display unit by scrolling the content item based on the calculated movement directions and movement distances.

With this, it is possible to appropriately notify the user of the object direction by performing control for presenting the predetermined vibration at each of the one or more of the positions touched by the user. In addition, it is possible to efficiently perform the operation for making a movement on the content item so as to re-display the object within the display area.

In this Description, multiple touches mean a plurality of touches in a state where simultaneous touches are made on a panel. In other words, multiple touches mean a plurality of touches on the panel at a certain point of time. Stated differently, multiple touches mean a plurality of temporally overlapping touches at different positions on the panel. Accordingly, multiple touches include not only a plurality of touches started simultaneously but also include a plurality of touches started at different points of time and detected simultaneously at a certain point of time. More specifically, when a first touch is started and then a second touch is started while the first touch is continued, the first touch and the second touch are multiple touches at the point of time when the second touch is started.

An embodiment of the present disclosure is described below with reference to the drawings.

It is to be noted that each of the embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the Claims. Therefore, among the structural elements in the following embodiments, structural elements not recited in any one of the independent claims which define the most generic concept are described as arbitrary structural elements.

Embodiment 1

A tactile/haptic feedback touch panel apparatus according to Embodiment 1 presents a vibration at one of touch positions detected on a multi-touch panel which is closer/closest to a target GUI (an icon, a button, or the like) and does not present the vibration at the other touch position(s) touched simultaneously. In this way, it is possible to present the direction in which the target GUI is present.

For example, a display including a multi-touch panel enables a function of displaying an enlarged map by moving the touch positions of two touches apart from each other and displaying a shrunk map by moving the touch positions of the two touches toward each other. In the case where a user uses a map for reference of information around a destination and the user enlarges, shrinks, or scrolls the map in an arbitrary direction, there is a possibility that an object (shown as an icon or a button on the display screen) such as the displayed destination goes outside the display area of the display screen, and the user cannot find anymore the right scroll direction for re-displaying the destination within the display area of the display screen. In the case where a display device including a multi-touch panel also mounts a GPS and displays a map based a current location, there is a possibility that an update of the display of the map along with a movement of the display device causes an icon or a button presenting a destination or an object to go outside the display area of the display screen.

In Embodiment 1, a vibration is presented at the touch position closer/closest to a target object among the touch positions on the touch panel, and the vibration is not presented at the other touch position(s) touched simultaneously when the object is present outside the display area. In this way, when the object is present outside the display area as mentioned above, the direction in which the target object is present is presented to the user. Embodiment 1 is considered to present the direction in which the object is present with an aim to re-display the target object within the display area. More specifically, a case where two touch positions are present is described. A vibration of a first tactile feedback signal is presented at the left touch position among two touch positions when an object is present to the left of the display area of the display screen, while a vibration of a first tactile feedback signal is presented at the right touch position among two touch positions when an object is present to the right of the display area of the display screen. On the other hand, a vibration of a second tactile feedback signal is presented at the upper touch position among two touch positions when an object is present above the display area of the display screen, while a vibration of a second tactile feedback signal is presented at the lower touch position among two touch positions when an object is present below the display area of the display screen.

FIG. 1A is a block diagram of a structure of a tactile/haptic feedback touch panel apparatus according to this embodiment of the present disclosure.

The tactile/haptic feedback touch panel apparatus 100 in this embodiment includes: a panel 101, actuators 102, a touch information obtaining unit 103, a direction determining unit 104, a vibration position determining unit 105, a vibration determining unit 106, a multi-point simultaneous vibration control unit 107, a movement input determining unit 108, a content control unit 109, and a display unit 110. In addition to the above structural elements, the tactile/haptic feedback touch panel apparatus 100 can also mount the following structural elements (not shown): a position measuring unit (such as a GPS module, a gyroscope, an electric compass) for measuring a position of the tactile/haptic feedback touch panel apparatus, a communication unit for receiving map data through communication (by, for example, a mobile communication scheme using a wireless LAN, W-CDMA/UMTS, LTE, or the like or near field communication), and an antenna. It is to be noted here such map data may be stored in a memory. Each of the structural elements may be implemented as exclusive hardware or realized by executing a software program suitable for the structural element. Each of the structural elements may be realized by means of a program executing unit such as a CPU or a processor reading a software program recorded on a recording medium such as a hard disk or a semiconductor memory and executing the read software program.

Examples of the tactile/haptic feedback touch panel apparatus according to the embodiments of the present disclosure include car navigation systems each embedded in a car or attached to a car, tablet devices, mobile phones, note computers, etc.

[Exemplary Tablet Device that Displays Map Data]

Figure 1B:
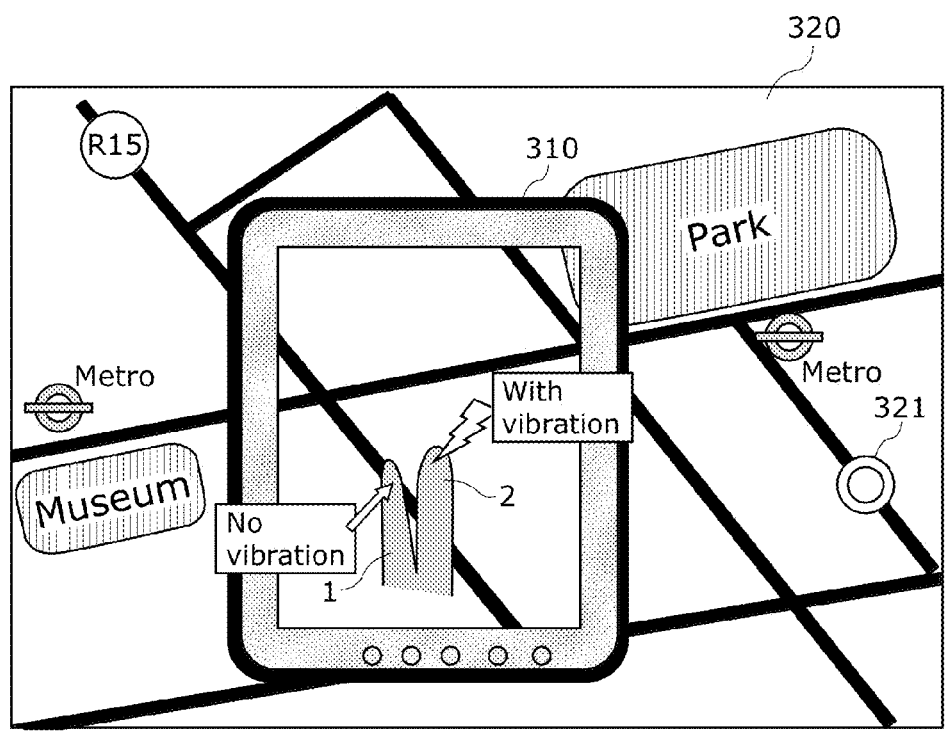
[FIG. 1B]

FIG. 1B is an illustration for explaining an example in which the tactile/haptic feedback touch panel apparatus is a tablet device 310, and map data 320 is displayed. It is impossible to display the whole map data 320 on the display area of the tablet device 310 particularly when the map is enlarged. The map data in FIG. 1B schematically shows the relationship between the outside and inside of the display area, but the map data of the outside is not actually presented on the display area. The target location 321 as the object is a location previously set as the target by a user or automatically set by the tablet device 310. In FIG. 1B, the target location 321 is outside the display area of the tablet device 310, and is not displayed. When the user makes multiple touches with his or her finger 1 and finger 2, a vibration of the first tactile feedback signal is presented at the touch position corresponding to the finger 2 because the finger 2 is closer to the target location 321 than the finger 1. In other words, since the target location 321 is present outside and to the right of the display screen, the vibration is presented at the touch position corresponding to the finger 2 present at the right touch position among the multi-touch positions. Any one of the exemplary methods disclosed in the Description is applicable as a method of vibrating the tablet (using the number of stimuli or an amplitude) and a method of determining the position at which a vibration is presented.

It is to be noted that the map data may include the whole world map, or may be map data which is of one or more continents, countries, regions and has any size according to the need or storage capacity.

Each of the structural elements is described below.

[Panel 101]

The panel 101 is a member for communicating a vibration, receives a touch operation by a user, and notifies the user of a vibration presenting the acceptance of the touch operation. The panel is preferably made of glass, polycarbonate, acrylic, ABS or the like which are durable to touch operations. However, the panel is not limited to such a panel, and may be a member that enables presentation of a vibration as a tactile feedback to the user.

The panel 101 does not need to be restricted in terms of the shape, size, thickness, hardness, the method of fixing the panel 101, etc. However, it is to be noted that communication characteristics of a vibration from an actuator 102 to each of positions (hereinafter also referred to as "points") on the panel 101 vary depending on the shape, size, thickness, hardness, the method of fixing the panel 101, etc.

[Actuator 102]

The actuator 102 presents a tactile feedback to the user by vibrating the panel 101. As the actuator 102, for example, a piezo-electric device, a vibration motor, a voice coil, artificial muscle, or the like can be used.

Figure 2:
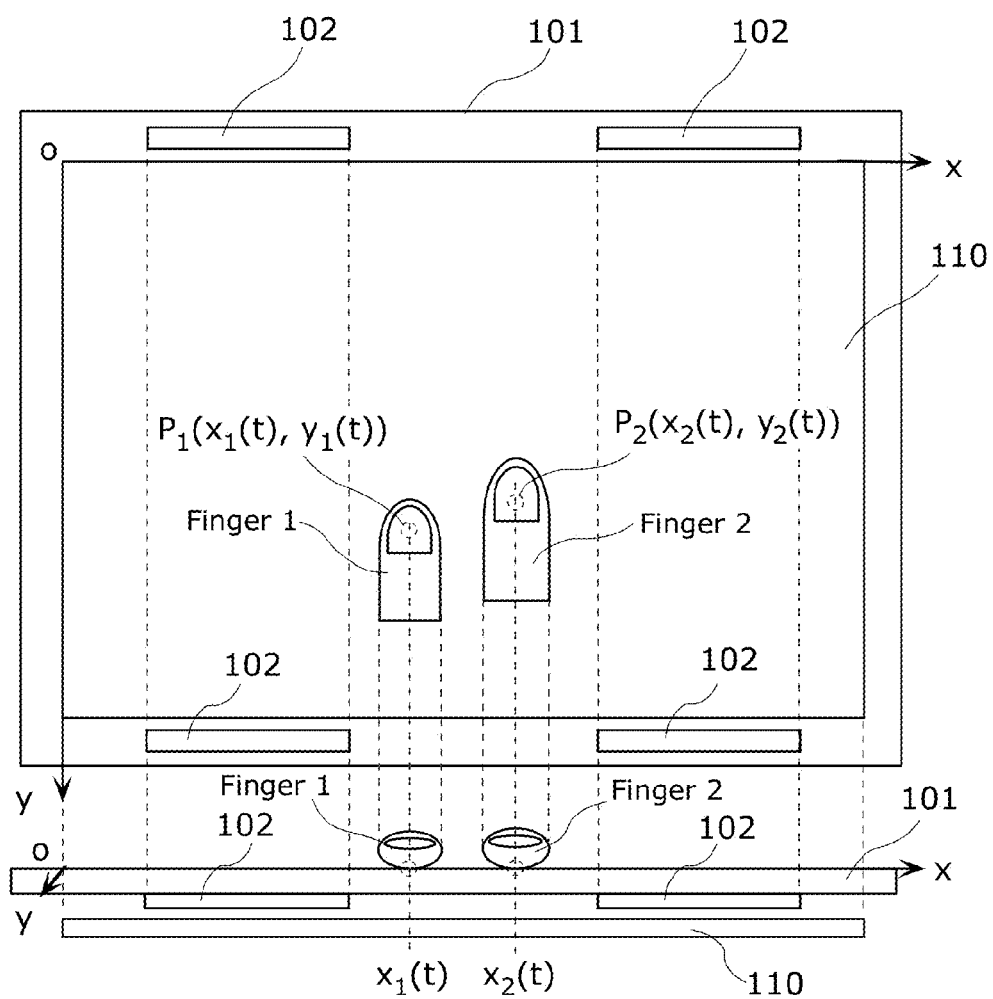
[FIG. 2]

FIG. 2 is an exemplary arrangement of actuators 102 on the panel 101. Each of the actuators 102 is fixed, for example, using an adhesive agent (not shown and, for example, an epoxy adhesive agent may be used when the actuator 102 is a piezo-electric device).

This embodiment is described taking an exemplary case where the number of actuators 102 is larger than or equal to the number of touch positions in touch operations on the panel 101. In this case, it is possible to present different vibrations at touch positions which are simultaneously detected and the number of which is equal to the number M of the actuators 102 (M is an integer larger than or equal to 2). In this embodiment, the number of actuators 102 is four and the number of touch positions is two (corresponding to the fingers 1 and 2) as shown in FIG. 2.

The arrangement positions of the actuators 102 do not need to be restricted particularly. For example, the actuators 102 may be arranged such that they can vibrate the panel 101 efficiently. The number of actuators 102 is four here, but this number is a non-limiting example.

[Touch Information Obtaining Unit 103]

The touch information obtaining unit 103 obtains a plurality of touch positions touched by the user on the panel 101.

For simplicity, two touch positions by two fingers 1 and 2 at time t in an exemplary case where touch operations are performed with the two fingers 1 and 2 are denoted as $P1(x1(t), y1(t))$ and $P2(x2(t), y2(t))$. In FIG. 2, the touch positions are presented using xy coordinates in a two-dimensional plane having O as its origin at the upper left end of the display unit 110 in the page space of FIG. 2.

As the touch information obtaining unit 103, a multi-touch panel of a capacitive or transparent type may be used for example. In an exemplary case where the touch information obtaining unit 103 is configured as a capacitive multi-touch panel, the touch information obtaining unit 103 obtains a plurality of touch positions based on a change in electrostatic capacity caused by the multiple touches. In another exemplary case where the touch information obtaining unit 103 is configured as a pressure-sensitive multi-touch panel, the touch information obtaining unit 103 obtains a plurality of touch positions based on a change in pressure caused by the multiple touches.

It is to be noted that the method of detecting multiple touches is not limited to the method of detecting multiple touches from a multi-touch panel of a capacitive or pressure-sensitive type. Any other scheme for detecting multiple touches is possible. For example, it is also good to capture an image of the positions of fingers using a CCD or CMOS camera and obtain the positions through processing of the image. A Frustrated Total Internal Reflection (FTIR) scheme may be used as an alternative in the case where the panel 101 is a transparent acrylic member. The FTIR scheme is for detecting, using a camera including an infrared filter, incident infrared light which enters through the side walls of the panel 101 and is enclosed within the panel 101 due to the total reflection property but partly leaked due to distortion of the panel 101 caused by touch operations.

[Direction Determining Unit 104]

Figure 3A:
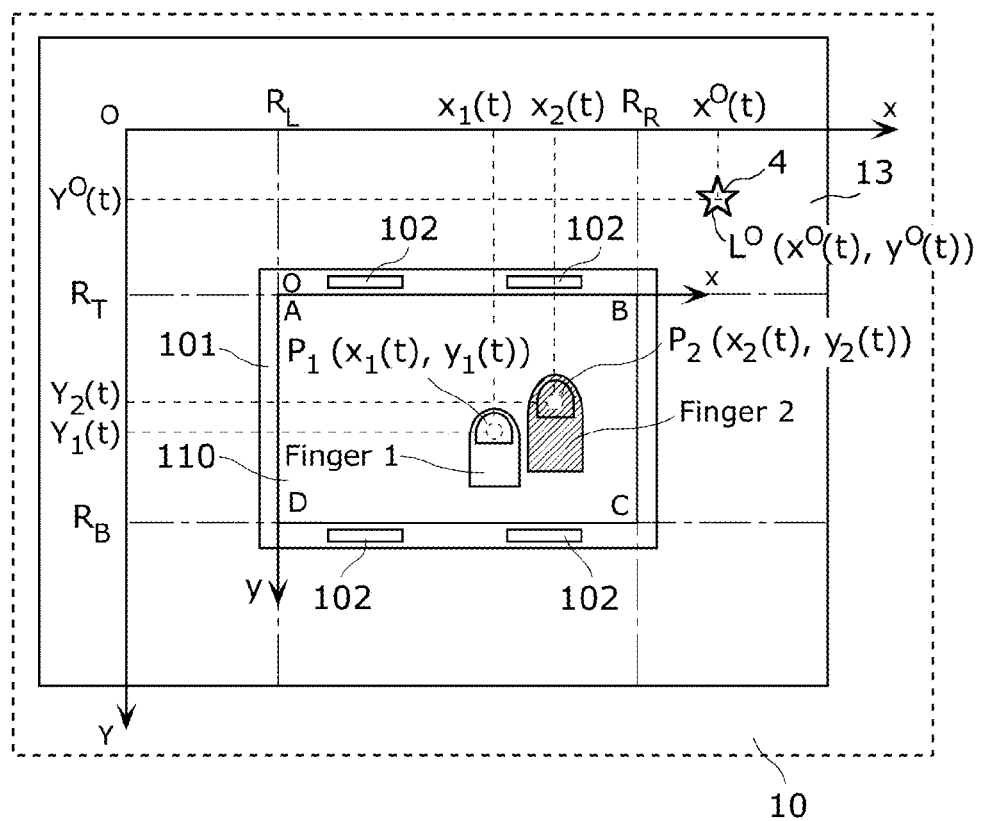
[FIG. 3A]

As shown in FIG. 3A, the direction determining unit 104 determines the object direction of an object 4 included in a content item (or content items) 3 with respect to the display area (a rectangle defined by A, B, C, and D) of the display unit 110. Here, for convenience in explanation, in FIG. 3A, the outline of a direction determination is described using an O-XY coordinate system in which an o-xy coordinate system presenting touch positions P1 and P2 and a coordinate system (not shown) presenting two-dimensional positions on a content item 13 are integrated. The following shows the relationship between the xy coordinates on the two-dimensional plane having o as its origin at the upper left end of the display unit 110 with respect to the page space. The x axis is defined along the long side (longer axis direction) of the display unit 110 and is parallel to the X axis of the integrated coordinate system. In addition, the y axis is defined along the short side (shorter axis direction) of the display unit 110 and is parallel to the Y axis of the integrated coordinate system. In addition, the coordinate values in the integrated coordinate system having o as its origin at the upper left end of the display unit 110 with respect to the page space are determined to be ($R_L$, $R_T$), and the coordinate values at the lower right end of the display unit 110 with respect to the page space are determined to be ($R_R$, $R_B$). At this time, the object direction of the object 4 ($X^O(t), Y^O(t)$) with respect to the display area (the rectangle defined by A, B, C, and D) of the display unit 110 is determined using the values of the ends of the display area (the rectangle defined by A, B, C, and D) of the display unit 110, specifically, the coordinate value $R_T$ at the upper end, the coordinate value $R_B$ at the lower end, the coordinate value $R_L$ at the left end, and the coordinate value $R_R$ at the right end. In the example of FIG. 3A, the coordinate values ($X^O(t), Y^O(t)$) of the object 4 and the $R_T$, $R_B$, $R_L$, and $R_R$ are compared with each other, resulting in a determination that the object 4 is present in the direction which is above the upper end $R_T$ of the display unit 110 and which is to the right of the right end $R_R$ of the display unit 110 with respect to the page space.

For example, the content item 13 may be a map, and the object 4 may be a display icon (hereinafter also referred to as a destination) of the position of the destination. It is to be noted here that the content item 13 and the object 4 are not limited thereto, and may be an electric document and a part thereof. For example, the content item 13 may be an electric document such as a Web page and the object 4 may be the position of a hyper link or an image included in the content item. In addition, the content item 13 may be an electric book, and the object 4 may be a bookmark. In other words, this embodiment is especially effective for an electric content item which is displayed on the display unit 110 and includes an object that may go outside the display area when a user makes a movement between pages or performs a scroll operation.

[Vibration Position Determining Unit 105]

The vibration position determining unit 105 compares each of the touch positions and the position of the object 4, and determines the touch position having the smallest distance to the object 4 as a first touch position at which a vibration is presented and determines the other touch position detected simultaneously with the first touch position and as a second touch position at which the vibration is not presented. The smallest distance is determined to be the smallest one of the distance calculated on the X axis and the distance calculated on the Y axis. In FIG. 3A, the coordinate values of the touch positions P1 and P2 on the integrated O-XY coordinate system are (X1(t), Y1 (t)) and (X2(t), Y2(t)), respectively. Compared to the coordinate value ($X^O(t), Y^O(t)$) of the object 4, the smallest distance on the X axis is the distance $X^O(t)-X2(t)$, and the smallest distance on the Y axis is the distance $Y^O(t)-Y2(t)$. The first touch position at which the vibration is presented is P2 irrespective of which smallest distance is selected. Thus, the touch position other than the first touch position which is the touch position P1 here is determined as the second touch position.

In this way, the user can check the touch position closest to the object 4 among the plurality of touch positions touched by the user based on the presence or absence of the vibration. In the example of FIG. 3A, a vibration is to be presented to the finger at a right side position (the touch position P2) in the page space, and the vibration is not to be presented to the finger at the left side position (the touch position P1). At this time, the user cannot find whether the vibration is presented to the right-side finger (at the touch position P2) because the object 4 is present to the right of the display or the vibration is presented to the right-side finger (at the touch position P2) because the right-side finger is above the left-side finger and the object 4 is present above the right-side finger. With an aim to distinguish these cases, the vibration determining unit determines a vibration to be presented to the user.

Here, it is also good to simply calculate a straight-line distance between each of the touch positions P1 and P2 and the object 4, and determine the touch position having the smallest distance to the object 4 to be the touch position at which the vibration is presented.

[Vibration Determining Unit 106]

The vibration determining unit 106 determines a tactile feedback signal presenting a vibration to be presented at the first touch position determined by the vibration position determining unit 105, based on the object direction of the object 4 determined by the direction determining unit 104. For example, a first tactile feedback signal is used when the object 4 is present, in the page space, in the direction to the left of the left end of the display unit 110 or in the direction to the right of the right end of the display unit 110, and a second tactile feedback signal is used when the object 4 is present in the direction above the upper end of the display unit 110 or in the direction below the lower end of the display unit 110 in the page space. The first and second signals may be any signals that can be distinguished based on the difference(s) in the number of vibration stimuli, frequency, amplitude, or the like. For example, the first tactile feedback signal may be a single stimulus signal shown in FIG. 4A and the second tactile feedback signal may be double stimulus signal shown in FIG. 4B.

In the case of FIG. 3A, the smallest one of the distance between the object 4 and the touch position P1 and the distance between the object 4 and the touch position P2 is the distance $X^O(t)-X2(t)$. Thus, presentation of the single stimulus signal shown in FIG. 4A allows the user to check that the object 4 is present to the right.

[Multi-Point Simultaneous Vibration Control Unit 107]

The multi-point simultaneous vibration control unit 107 calculates a driving signal for driving each of the actuators to present the vibration of the tactile feedback signal at the first touch position and a driving signal for driving each of the actuators not to present the vibration at the second touch position, and performs simultaneous vibration control for the respective touch positions on the panel by driving the actuators using the calculated driving signals.

[Movement Input Determining Unit 108]

The movement input determining unit 108 calculates the movement distances of the touch positions, based on time-series information of the touch positions obtained by the touch information obtaining unit 103. The user recognizes the direction in which the object 4 is present, based on the touch position at which the vibration is presented by the multi-point simultaneous vibration control unit 107 and the kind of the tactile feedback signal. The user scrolls the content item 13 based on the movement distances of the calculated touch positions so as to display the object 4 within the display area of the display unit 110.

[Content Control Unit 109]

The content control unit 109 displays the content item 13 on the display unit 110 by scrolling it based on the movement directions and movement distances calculated by the movement input determining unit 108. In the case where the object 4 enters the display area of the display unit 110 as a result of moving the content item 13 based on the movement directions and movement distances, the content control unit 109 completes the processing. However, in the case where the object 4 does not enter the display area of the display unit 110 as a result of moving the content item 13 based on the movement directions and movement distances, the following operations are performed again: obtainment of touch positions by the touch information obtaining unit 103, determination of the direction of the object 4 by the direction determining unit 104, and presentation of a vibration presenting the direction of the object 4 by the multi-point simultaneous vibration control unit 107. As the display unit 110, a display of an LCD, an organic EL, electric paper, or the like may be used.

[Operations]

Operations performed by the tactile/haptic feedback touch panel apparatus 100 configured as described above according to Embodiment 1 are described with reference to FIGS. 3 to 15.

Figure 5:
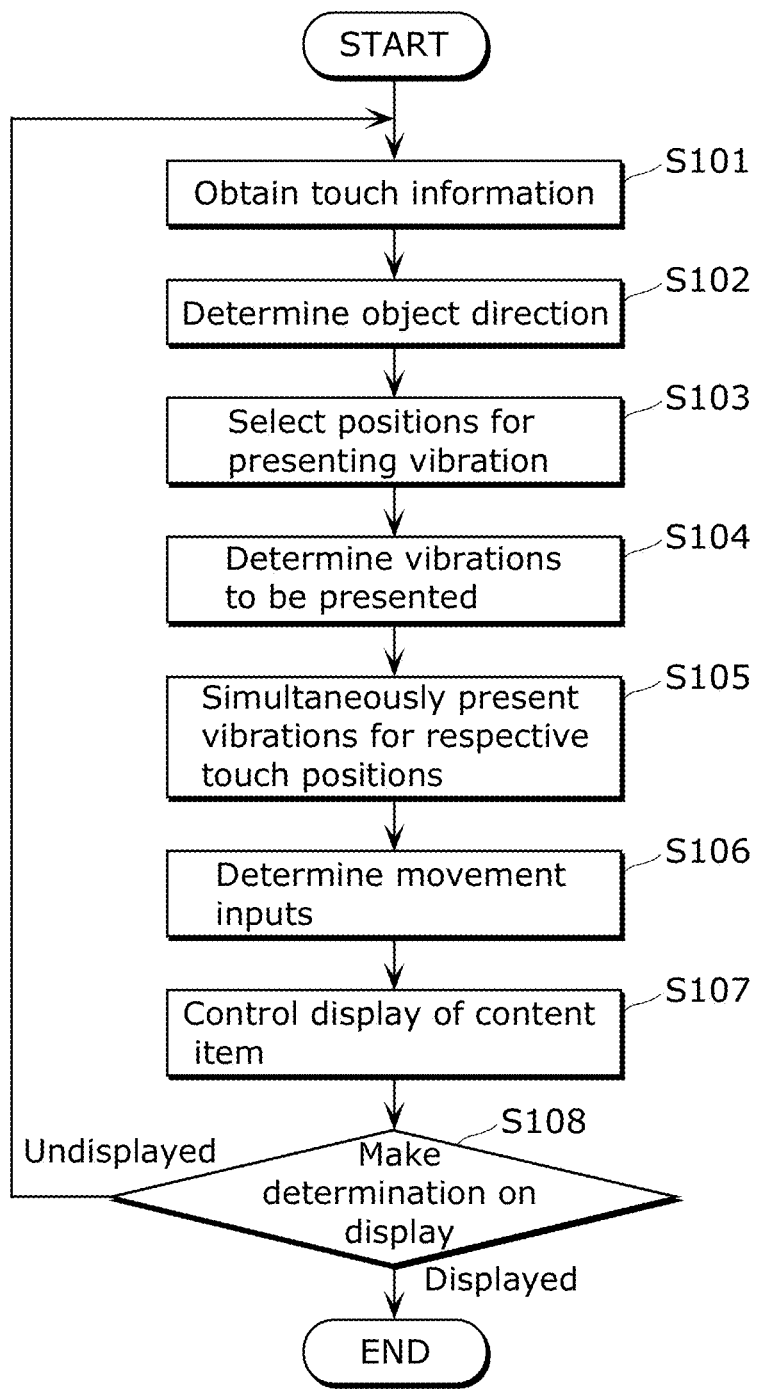
[FIG. 5]

FIG. 5 is a flowchart of operations performed by the tactile/haptic feedback touch panel apparatus 100 in this embodiment of the present disclosure. Based on the flowchart, operations by the tactile/haptic feedback touch panel apparatus 100 in Embodiment 1 are described in detail.

Figure 3B:
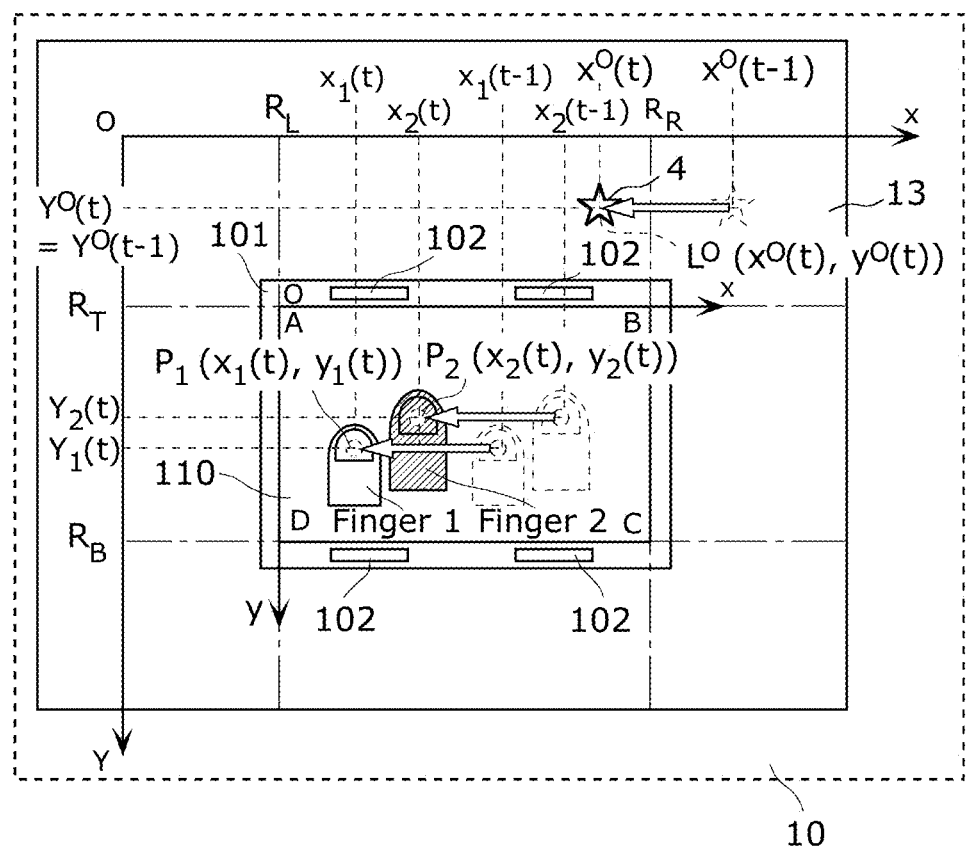
[FIG. 3B]
Figure 3C:
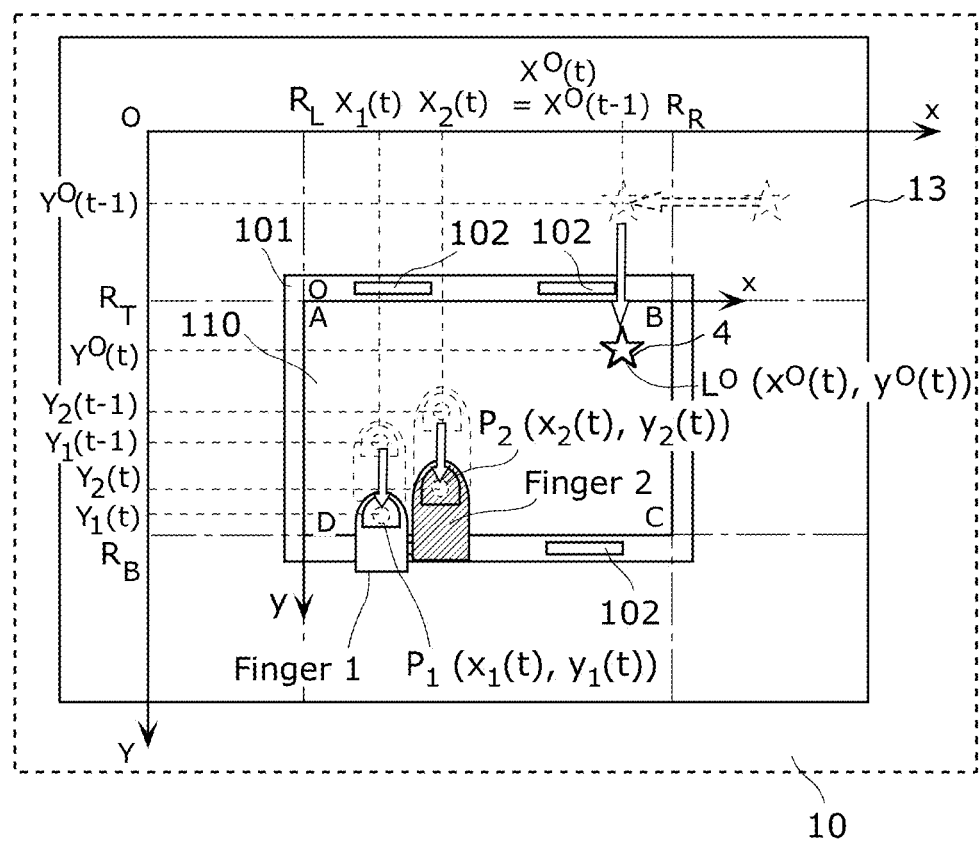
[FIG. 3C]

Embodiment 1 is described taking an example as shown from FIGS. 3A to 3C in which the tactile/haptic feedback touch panel apparatus 100 is mounted on an electric device 10 which performs scroll control of the content item 13 displayed on the display unit 110. The following descriptions are given taking an example in which a user is allowed to recognize the direction of an object 4 (for example, a display icon indicating a destination) on the content item 13 (such as a map), specifically the direction of the object 4 which is present outside the display area of the display unit 110 and can be subjected to scroll operations, by presenting a vibration at a touch position closest to the object 4 among a plurality of current touch positions on the panel 101.

(Step S101: Obtainment of Touch Information)

The touch information obtaining unit 103 obtains a plurality of touch positions touched by the user on the panel 101.

In the example of FIG. 3A, when two fingers such as a finger 1 and a finger 2 are used in touch operations, the touch positions of these two fingers 1 and 2 at time t are obtained as P1(x1(t), y1(t)), and P2 (x2(t), y2(t)). The touch positions P1 and P2 re obtained as time-series information at sampling intervals such as 10 ms.

(Step S102: Determination of Object Direction)

The direction determining unit 104 determines the direction of the object 4 in the content item 13 with respect to the display area (the rectangle defined by A, B, C, and D) of the display unit 110 as shown in FIGS. 3A, 3B, and 3C. Here, for convenience in explanation, with reference to FIGS. 3A, 3B, and 3C, the outline of the direction determination is explained using the O-XY coordinate system obtained by integrating the o-xy coordinate system presenting the touch positions P1 and P2 on the panel 101 and the coordinate system (not shown) presenting the two-dimensional positions on the content item 13. The coordinates of the object 4 are denoted as LO $(X^O(t), Y^O(t))$. The following shows the relationship between the xy coordinates on the two-dimensional plane having o as its origin at the upper left end of the display unit 110 in the page space and the integrated coordinate system O-XY. The x-axis is defined along the long side of the display unit 110, and to be parallel to the X-axis of the integrated coordinate system. In addition, the y-axis is defined along the short side of the display unit 110, and to be parallel to the Y-axis of the integrated coordinate system. In addition, in the page space, $(R_L, R_T)$ denote the coordinate values of the origin o which is in the integrated coordinate system and at the upper left end of the display unit 110, and $(R_R, R_B)$ denote the coordinate values at the lower right end of the display unit 110. At this time, the direction of the object 4 having the coordinate values $L^O(X^O(t), Y^O(t))$ in the display area (the rectangle defined by A, B, C, and D) of the display unit 110 is determined using the coordinate values at the ends of the display area (the rectangle defined by A, B, C, and D) of the display unit 110, specifically, the coordinate value $R_T$ at the upper end, the coordinate value $R_B$ at the lower end, the coordinate value $R_L$ at the left end, the coordinate value $R_R$ at the right end. In the example of FIG. 3A, the coordinate values $L^O(X^O(t), Y^O(t))$ and the $R_T$, $R_B$, $R_L$, and $R_R$ of the object 4 are compared, resulting in a determination that the object 4 is present, in the page space, in the direction which is above the upper end $R_T$ and which is to the right of the right end RR of the display unit 110. FIG. 3B shows an example in which the touch positions P1 and P2 are moved to scroll the content item 13 in the left direction of the page space. Likewise, in the example of FIG. 3B, the coordinate values $L^O(X^O(t), Y^O(t))$ of the object 4 and the $R_T$, $R_B$, $R_L$, and $R_R$ are compared, resulting in a determination that the object 4 is present, in the page space, in the direction which is above the upper end $R_T$ and which is between the left end $R_L$ and the right end RR of the display unit 110. FIG. 3C shows an example in which the touch positions P1 and P2 are moved to scroll the content item 13 in the lower direction of the page space. Likewise, in the example of FIG. 3C, the coordinate values $L^O(X^O(t), Y^O(t))$ of the object 4 and the $R_T$, $R_B$, $R_L$, and $R_R$ are compared, resulting in a determination that the object 4 is present, in the page space, in the direction which is between the upper end $R_T$ and the lower end $R_B$ of the display unit 110 and which is between the left end $R_L$ and the right end RR of the display unit 110. In other words, in this case, it is determined that the object 4 is displayed in the display area (the rectangle defined by A, B, C, and D) of the display unit 110.

In this example, the content item 13 can be the map, and the object 4 can be the display icon showing the destination position (this display icon may be referred to as a destination hereinafter). It is to be noted here that the content item 13 and the object 4 are not limited thereto, and may be an electric document and a part thereof. For example, the content item 13 may be an electric document such as a Web page and the object 4 may be the position of a hyper link or an image included in the content item 13. In addition, the content item 13 may be an electric book, and the object 4 may be a bookmark. In other words, this embodiment is especially effective for an electric content item which is displayed on the display unit 110 and includes an object that may go outside the display area when a user makes a movement between pages or performs a scroll operation.

(Step S103: Determination of Vibration Position)

The vibration position determining unit 105 compares each of the touch positions and the position of the object 4, and determines the touch position having the smallest distance to the object 4 as a first touch position at which a vibration is presented and determines the other touch position detected simultaneously with the first touch position as a second touch position at which the vibration is not presented. The smallest distance is determined to be the smallest one of the distance calculated on the X axis and the distance calculated on the Y axis. In FIG. 3A, the coordinate values of the touch positions P1 and P2 on the integrated O-XY coordinate system are (X1(t), Y1 (t)) and (X2(t), Y2(t)), respectively. Compared to the coordinate values $L^O(X^O(t), Y^O(t))$ of the object 4, the smallest distance on the X axis is the distance $X^O(t)-X2(t)$, and the smallest distance on the Y axis is the distance $Y^O(t)-Y2(t)$. The first touch position at which the vibration is presented is P2 irrespective of which smallest distance is selected. Thus, the touch position other than the first touch position which is the touch position P1 here is determined as the second touch position. In other words, in the case of FIG. 3A, a vibration is presented to the finger 2 shown with diagonal lines, and the vibration is not presented to the finger 1. Likewise, in FIG. 3B, the coordinate values of the touch positions P1 and P2 on the integrated O-XY coordinate system are (X1(t), Y1(t)) and (X2(t), Y2 (t)), respectively. Compared to the coordinate values $L^O(X^O(t), Y^O(t))$ of the object 4, the smallest distance on the X axis is the distance $X^O(t)-X2(t)$, and the smallest distance on the Y axis is the distance $Y^O(t)-Y2(t)$. The first touch position at which the vibration is presented is P2 irrespective of which smallest distance is selected. Thus, the touch position other than the first touch position which is the touch position P1 here is determined as the second touch position. In other words, in the case of FIG. 3B, a vibration is presented to the finger 2 shown with diagonal lines, and the vibration is not presented to the finger 1. Likewise, in FIG. 3C, the coordinate values of the touch positions P1 and P2 on the integrated O-XY coordinate system are (X1t), Y1(t)) and (X2(t), Y2(t)), respectively. Compared to the coordinate values $L^O(X^O(t), Y^O(t))$ of the object 4, the smallest distance on the X axis is the distance $X^O(t)-X2(t)$, and the smallest distance on the Y axis is the distance $Y^O(t)-Y2(t)$. The first touch position at which the vibration is presented is P2 irrespective of which smallest distance is selected. Thus, the touch position other than the first touch position which is the touch position P1 here is determined as the second touch position. In other words, in the case of FIG. 3B, a vibration is presented to the finger 2 shown with diagonal lines, and the vibration is not presented to the finger 1.

The aforementioned determination of the vibration position allows the user to check the touch position closest to the object 4 among the plurality of touch positions touched by the user based on the presence or absence of the vibration. In the example of FIG. 3A, the vibration is presented to the right finger (at the touch position P2) and the vibration is not presented to the left finger (at the touch position P1) in the page space. At this time, the user cannot distinguish the case where the vibration is presented to the right-side finger (at the touch position P2) which is positioned to the right of the left-side finger 1 (at the touch position P1) and closer to the object 4 than the left-side finger 1 and the case where the vibration is presented to the right-side finger (at the touch position P2) which is positioned above the left-side finger 1 (at the touch position P1) and closer to the object 4 than the left-side finger 1. With an aim to distinguish these cases, two kinds of vibrations are used in this embodiment. In the next Step S104, the vibration determining unit 106 determines such two vibrations to be presented to the user.

Here, it is also good to simply calculate a straight-line distance between each of the touch positions P1 and P2 and the object 4, and determine the touch position having the smallest distance to the object 4 to be the touch position at which the vibration is presented.

(Step S104: Determination of Vibration to be Presented)

The vibration determining unit 106 determines a tactile feedback signal presenting a vibration to be presented at the first touch position determined by the vibration position determining unit 105, based on the object direction of the object 4 determined by the direction determining unit 104. For example, a first tactile feedback signal is used when the object 4 is present, in the page space, in the direction to the left of the left end of the display unit 110 or in the direction to the right of the right end of the display unit 110, and a second tactile feedback signal is used when the object 4 is present, in the page space, in the direction above the upper end of the display unit 110 or in the direction below the lower end of the display unit 110.

This is described in detail. First, a determination is made as to whether or not the coordinate values $X^O(t)$ and $Y^O(t)$ of the object 4 are respectively within the ranges of $[R_L, R_R]$ and $[R_T, R_B]$. When at least one of the coordinate values $X^O(t)$ and $Y^O(t)$ is outside the range, RL, RR, RT, and RB which yield the smallest distance are selected in relation to the coordinate values of the object outside the range. It is determined here that a first tactile feedback signal is used when $R_L$ or $R_R$ is selected, and a second tactile feedback signal is used when $R_T$ or $R_B$ is selected.

For example, in the case of FIG. 3A, both of the coordinate values $X^O(t)$ and $Y^O(t)$ of the object 4 are respectively outside the ranges of $[R_L, R_R]$ and $[R_T, R_B]$. The right end $R_R$ has the smallest distance from the object 4, and thus the first tactile feedback signal is selected, and the vibration is presented to the finger 2 at the touch position P2 having the smallest distance from the object 4 while the vibration is not presented at the touch position P1. In the case of FIG. 3A, the user can firstly check that the object 4 is present to the right of the right end $R_R$ of the display unit 110 in this way. Next, as shown in FIG. 3B, the user scrolls the object 4 notified to be present to the right of the display unit 110 toward the left direction of the page space so as to display the object 4 within the display range of the display unit 110. At this time, a determination is made as to whether or not the coordinate values $X^O(t)$ and $Y^O(t)$ of the object 4 are respectively within the ranges of $[R_L, R_R]$ and $[R_T, R_B]$. In the case of FIG. 3B, the second tactile feedback signal is selected because $Y^O(t)$ is outside the range $[R_T, R_B]$, and because the upper end $R_T$ has the smallest distance from the object 4. In addition, the vibration is presented to the upper-side finger 2 at the touch position P2 having the smallest distance from the object 4, while the vibration is not presented at the touch position P1. In the case of FIG. 3B, the user can check that the object 4 is present above the upper end $R_T$ of the display unit 110 in this way. Next, as shown in FIG. 3C, the user scrolls the object 4 notified to be present above the display unit 110 toward the lower direction of the page space so as to display the object 4 within the display range of the display unit 110. At this time, a determination is made as to whether or not both of the coordinate values $X^O(t)$ and $Y^O(t)$ of the object 4 are respectively within the ranges of $[R_L, R_R]$ and $[R_T, R_B]$. In the case of FIG. 3C, both the $X^O(t)$ and $Y^O(t)$ are within the range, and thus it is determined that the object 4 is displayed within the display area of the display unit 110. In this case, the vibration on the panel 101 may be stopped, or the vibration may be continuously presented to show the first touch position having the smallest distance from the object 4.

Figure 4A:
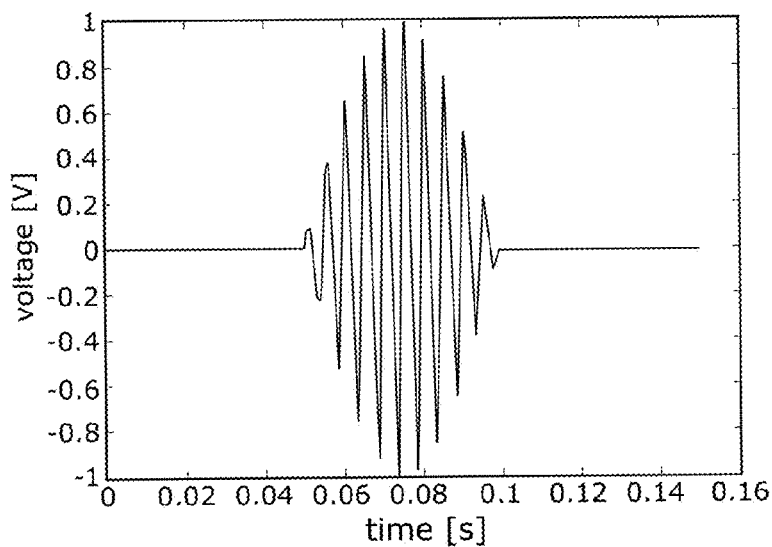
[FIG. 4A]

The first and second tactile feedback signals may be any signals that can be distinguished based on the difference(s) in the number of vibration stimuli, frequency, amplitude, or the like. For example, the first tactile feedback signal may be a single stimulus signal shown in FIG. 4A and the second tactile feedback signal may be double stimulus signal shown in FIG. 4B. The tactile feedback signal shown in FIG. 4A is generated according to the following Expression (1). FIG. 4A shows a sine wave modulated using a modulation frequency fm having a cycle corresponding to exactly the half of an r cycle of a sine wave of a frequency fc in the case of s(n) number of tactile feedback signals generated based on a signal corresponding to the r cycle.

[Math. 1]

$$s(n) = \sin(2\pi f_m n T_s)\sin(2\pi f_c n T_s) \quad (1)$$
$$f_m = \frac{f_c}{2r}$$

Here, $T_S$ shows a sampling period. In the example of FIG. 4A, fc=200 Hz, and r=10, and thus the modulation frequency fm is 10 Hz. The tactile feedback signal generated in this way can be used as a signal for presenting a tactile feedback similar to a tactile feedback obtained by making a single-click on a physical switch (hereinafter referred to as a single stimulus signal). This tactile feedback allows the user to check that the preset value is incremented or decremented by 1.

Figure 4B:
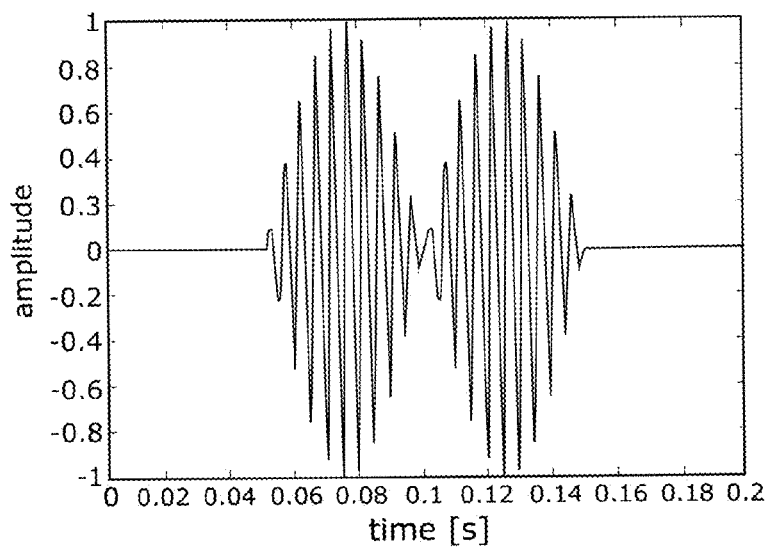
[FIG. 4B]

Likewise, FIG. 4B shows a sine wave modulated using a modulation frequency fm having a cycle corresponding to exactly an r cycle of a sine wave of a frequency fc in the case of s(n) number of tactile feedback signals generated based on a signal corresponding to the r cycle. The tactile feedback signal generated in this way can be used as a signal for presenting a tactile feedback similar to a tactile feedback obtained by making a double-click on a physical switch (hereinafter referred to as a double stimulus signal).

Tactile feedback signals do not always need to be the signals generated in the aforementioned manner. For example, the modulation according to Expression (1) does not need to be performed. In other words, it is also good to use a sine wave as a tactile feedback signal, more specifically, use sine waves having different time lengths as the first and second tactile feedback signals.

Here, the frequency fc may be any frequency which can be sensed by the user as a tactile feedback. For example, the frequency fc may be determined based on vibration characteristics of the panel 101.

For example, the frequency fc may be determined to match a resonance frequency of the panel 101. The determined frequency fc makes it possible to reduce attenuation of the vibration provided by each of the actuators 102 on the panel 101, and to thereby efficiently present the tactile feedback.

(Step S105: Multi-Point Simultaneous Vibration Control)

The multi-point simultaneous vibration control unit 107 calculates a driving signal for driving each of the actuators to present the vibration of the first or second tactile feedback signal at the first touch position determined through Step S103 and Step 104, and a driving signal for driving each of the actuators not to present the vibration at the second touch position, and performs simultaneous vibration control for the respective touch positions on the panel by driving the actuators using the calculated driving signals.

More specifically, the vibration of the first tactile feedback signal is presented at the left touch position among the two touch positions when an object is present to the left of the display area of the display unit 110, while the vibration of the first tactile feedback signal is presented at the right touch position among the two touch positions when an object is present to the right of the display area of the display unit 110. In addition, when the object is present above the display area of the display unit 110, the vibration of the second tactile feedback signal is presented to the upper touch position among the two touch positions. In contrast, when the object is present below the display area of the display unit 110, the vibration of the second tactile feedback signal is presented at the lower touch position among the two touch positions.

It is to be noted that the multi-point simultaneous vibration control unit 107 may always vibrate the panel 101 at the time of the detection of the touch positions P1 and P2 by the touch information obtaining unit 103, or may repeat a set of presentation and stoppage of the vibration at predetermined time intervals. In addition, it is possible to present the vibration presenting the direction information only when required by performing vibration control in which the vibration is not presented in the case of one touch position, and a direction is presented only in the case of two touch positions so as to allow the user to scroll the content item 13 with a finger and touch a second point at the time when the user wishes to find the object direction. Therefore, it is possible to reduce panel vibrations unnecessary for the user and in terms of power consumption. A specific structure of the multi-point simultaneous vibration control unit 107 and exemplary operations performed thereby are described later.

(Step S106: Determinations of Movement Inputs)

The movement input determining unit 108 calculates movement directions and movement distances of the touch positions, based on time-series information of the touch positions obtained by the touch information obtaining unit 103. The user recognizes the direction in which the object 4 is present, based on the touch position at which the vibration is presented by the multi-point simultaneous vibration control unit 107 and the kind of the tactile feedback signal. The user scrolls the content item 13 based on the movement distances of the calculated touch positions so as to display the object 4 within the display area of the display unit 110.

The movement directions of the touch positions are calculated as indicated below. Here, the movement directions at the time when the touch positions are moved with fingers touched on the panel 101 are calculated based on the time-series information of the touch positions obtained in Step S101. More specifically, a movement vector showing the movement direction of the touch position P1 for each sampling interval Δt is v1(x1(t)−x1 (t−1), y1(t)−y1 (t−1), and a movement vector showing the movement direction of the touch position P2 for each sampling interval Δt is v2 (x2(t)−x2 (t−1), y2 (t)−y2 (t−1). However, (t−1) shows time of an immediately-before sample. FIG. 3B shows an example of a movement input by scrolling the content item 13. FIG. 3B shows an example of scrolling the content item 13 to the left in the page space by moving the touch position to the left. In the O-XY coordinate system obtained by integrating the o-xy coordinate system presenting the touch positions P1 and P2 on the panel 101 and the coordinate system (not shown) presenting the two-dimensional positions on the content item 13, the fingers 1 and 2 simultaneously touch the panel 101 at time (t−1), and the touch positions P1 and P2 are respectively X1 (t−1), and X2 (t−1). The movement directions of the fingers 1 and 2 are respectively v1=X1(t)−X1(t−1) and v2=X2(t)−X2 (t−1). Likewise, FIG. 3C shows an example of scrolling the content item 13 to the bottom in the page space by moving the touch position to the bottom. At this time, the movement directions of the fingers 1 and 2 are respectively v1=Y1(t)−Y1 (t−1) and v2=Y2(t)−Y2 (t−1).

The movement distances of the touch positions are calculated as indicated below. A movement distance d1(t) of the touch position of the finger 1 of the user from the time (t=0, the movement start position P1(X1(0), Y1(0)) at which the user touches the panel 101 with the finger 1 to time t (the touch position P1((X1(t), Y1(t)) is calculated according to Expression (2). Here, the movement of the touch position P1 made by sliding with the finger 1 is determined to be stopped when the touch position P1((X1(t),Y1(t)) obtained at time t and the touch position P1(X1 (t−1), Y1 (t−1)) obtained at time (t−Δt) are identical to each other or when the distances P1((X1(t),Y1 (t)) and P1(X1 (t−1), Y1 (t−1)) are smaller than a predetermined distance. When the movement of the touch position is determined to be stopped, the movement start position P1(X1 (0),Y1(0) is initialized. In addition, using, as a base point, the determined time of the stoppage of the movement of the touch position, whether or not a touch stops at the position of the stoppage of the movement of the touch position is checked for each sampling interval Δt, stoppage time t1s of the P1 is recorded and updated. The movement distance d2(t) of the touch position P2 made with the finger 2 is also calculated according to Expression (2), the stoppage time t2s of the P2 is also recorded and updated.

[Math. 2]

$$d_1(t) = \sum_{t=1}^{t} \sqrt{(X_1(t) - X_1(t-1))^2 + (Y_1(t) - Y_1(t-1))^2} \quad (2)$$

(Step S107: Content Control)

The content control unit 109 displays the content item 13 on the display unit 110 by scrolling it based on the movement directions and movement distances of touch positions calculated in Step S106 by the movement input determining unit 108.

FIG. 6 shows exemplary control patterns of the control 13 based on the movement directions and movement distances of the touch positions.

The control pattern [1] is for a case where the number of touches detected by the touch information obtaining unit 103 is 1 and the touch position P1 is moved in the direction of a movement vector v1. At this time, display control for moving the content item 13 by the movement distance d1 calculated according to Expression (2) is performed. More specifically, for example, the whole content item 13 is moved according to the movement vector v1. In this way, the coordinate values $(X^O(t), Y^O(t))$ of the object 4 is moved to $(X^O(t-)+(X1(t)-X1(t-1)), Y^O(t-1)+(Y1(t)-Y1(t-1))$. For example, the coordinate values $(X^O(t), Y^O(t))$ of the object 4 is moved to $(X^O(t-1)+(X1(t)-X1(t-1))$ in the case of FIG. 3B, and to $(X^O(t-1), Y^O(t-1)+(Y1(t)-Y1(t-1))$ in the case of FIG. 3C.

The control pattern [2] is for sequentially scrolling the content item 13 in the direction of the movement vector v1 when the following conditions are satisfied: the number of touches detected by the touch information obtaining unit 103 is 1; the touch position P1is moved in the direction of the movement vector v1; the movement distance d1 calculated according to Expression (2) is larger than or equal to a predetermined threshold value D; and the stoppage time t1s of the touch position is larger than or equal to a predetermined threshold value Ts, in other words, when the touch position P1 stops after the movement thereof by the predetermined distance. In this way, the coordinates of the object 4 are moved by $L^O+\alpha v1$ for each predetermined period. Here, a denotes a positive constant.

The control pattern [3] is for performing display control in which the content item 13 is moved by the movement distance d1 or d2 calculated according to Expression (2) when the number of touches detected by the touch information obtaining unit 103 is 2, and the movement directions v1 and v2 of the touch positions P1 and P2 are identical to each other. More specifically, the content item 13 is scrolled in the direction of the movement vector v1 or v2. In this way, the coordinates of the object 4 are moved by $(L^O+v1)$ or $(L^O+v2)$. Here, α denotes a positive constant.

The control pattern [4] is for sequentially moving the content item 13 when the following conditions are satisfied: the number of touches detected by the touch information obtaining unit 103 is 2; the movement directions v1 and v2 of the touch positions P1 and P2 are identical to each other; the movement distance d1 or d2 calculated according to Expression (2) is larger than or equal to the predetermined threshold value D; and both of the stoppage times t1s and t2s of the touch positions P1 and P2 are larger than or equal to the predetermined threshold value Ts, in other words, when the touch positions P1 and P2 stop after the movements of the touch positions P1 and P2 in the same direction by the predetermined distance. More specifically, the content item 13 is scrolled sequentially in the direction of the movement vector v1 or v2. In this way, the coordinates of the object 4 are moved by $(L^O+\alpha v1)$ or $(L^O+\alpha v2)$ for each predetermined period. Here, a denotes a positive constant.

The movement directions of the touch positions P1 and P2 are determined to be identical to each other when, for example, the cosine value of an angle θ of the movement vectors v1 and v2 are smaller than a predetermined threshold value. In addition, the movement vector for scrolling the content item 13 may be arbitrarily selected from among the movement vectors v1 and v2. For example, one of the movement vectors which has the larger one of the movement distances calculated according to the aforementioned procedure may be selected.

(Step S108: Determination on Display)

The content control unit 109 completes the above processing in the case where the object 4 enters the display area of the display unit 110 as a result of moving the content item 13 based on the movement directions and movement distances. However, in the case where the object 4 does not enter the display area as the result, a return to Step S101 is made and the following operations are performed again until the object 4 enters the display area of the display unit 110: obtainment of the touch position by the touch information obtaining unit 103; determination of the direction of the object 4 by the direction determining unit 104; determination of the touch position at which a vibration is to be presented by the vibration position determining unit 105; determination of a tactile feedback signal to be presented by the vibration determining unit 106; and presentation of the object direction by the multipoint simultaneous vibration control unit 107.

With the structure and operations, the tactile/haptic feedback touch panel apparatus 100 according to Embodiment 1 presents a vibration at the touch position closest to the target object present outside the display area among the touch positions on the touch panel and does not present the vibration at the other touch position touched simultaneously. More specifically, the present disclosure provides the tactile/haptic feedback touch panel apparatus which presents the direction in which the object is present in the following manner: by presenting the vibration of the first tactile feedback signal at the left touch position among the two touch positions when the object is present to the left of the display area on the display screen; by presenting the vibration of the first tactile feedback signal at the right touch position among the two touch positions when the object is present to the right of the display area on the display screen; by presenting the vibration of the second tactile feedback signal at the upper touch position among the two touch positions when the object is present above the display area on the display screen; and by presenting the vibration of the second tactile feedback signal at the lower touch position among the two touch positions when the object is present below the display area on the display screen.

In this way, it is possible to present the user with the direction in which the target object is present, and to efficiently achieve operations for making a movement on the target content item to re-display the object within the display area.

Embodiment 1 is described taking an example case where the object 4 is only one, but this is a non-limiting example. For example, a variation of Embodiment 1 is naturally considered in which the number of touches is assigned to each a plurality of objects and the object for which a direction is presented can be changed between the objects. In this way, in response to an operation for re-displaying a plurality of highlighted portions marked on an electric document, it is possible to switch to a direction toward which a document should be scrolled, and present the direction. In addition, also in the case of scrolling a Web content item, for example, each of positions double-tapped with two or three fingers may be registered as a destination associated with the number of touches, and the vibration presenting the direction of the destination can be presented according to the number of touches.

Figure 7A:
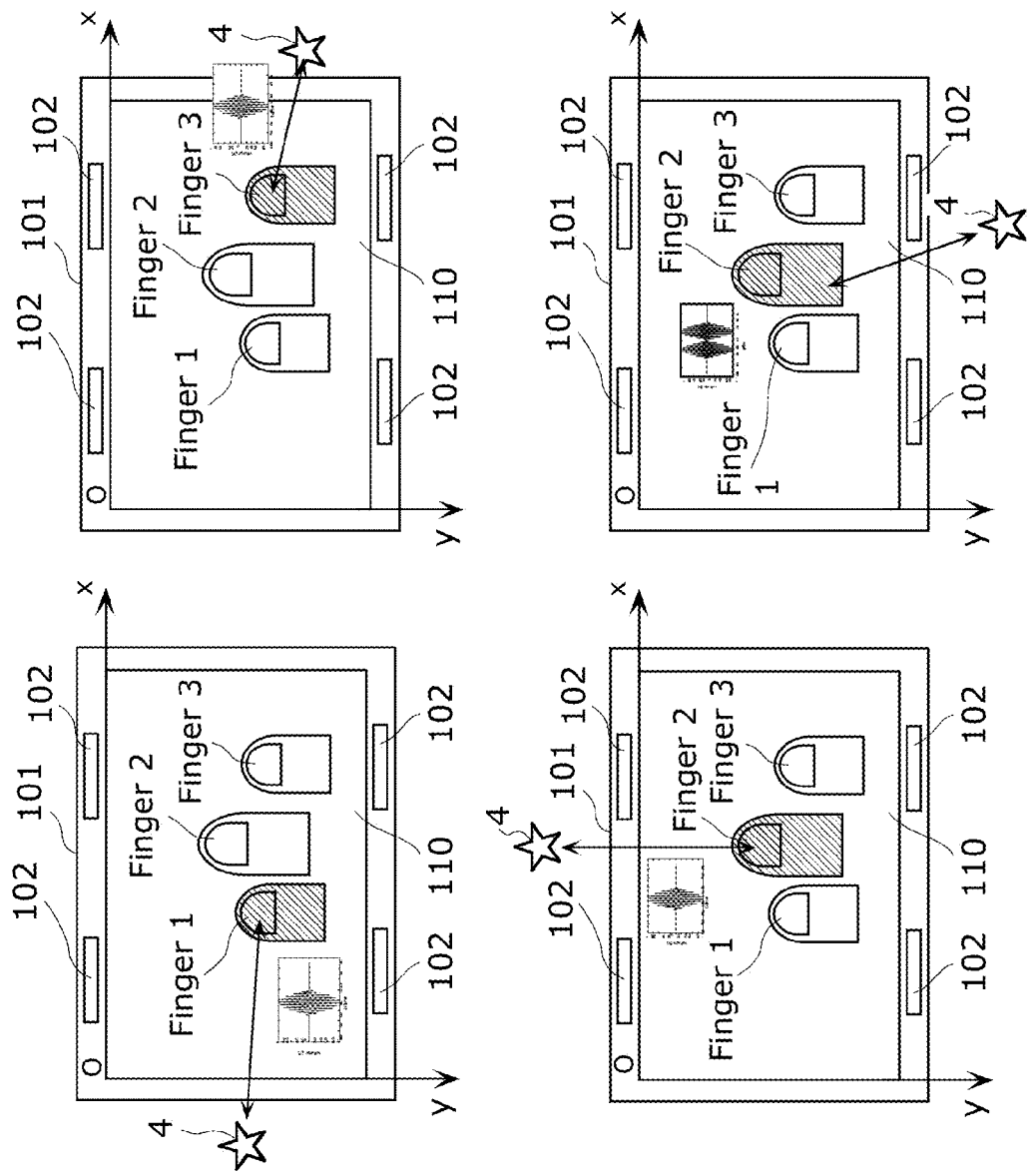
[FIG. 7A]

Embodiment 1 is described taking an example case of vibrating the touch position closest to the object and not vibrating the other touch position with an aim to allow the user to recognize the object direction corresponding to one of the upper or lower direction and the left or right direction based on the upper and lower positional relationship or the left and right positional relationship of the touch positions and also on the two kinds of tactile feedback signals. However, this is a non-limiting example. A variation of Embodiment 1 is provided taking an example where the panel 101 is touched with three fingers as shown in FIG. 7A. When the object 4 is present to the left of the display unit 110, a vibration of a first tactile feedback signal is presented at only the leftmost touch position (for example, the position of an index finger), and when the object 4 is present to the right of the display unit 110, a vibration of a first tactile feedback signal is presented to only the rightmost touch position (for example, the position of a ring finger). In order to present the object direction in the upper direction, it is also good to present a vibration of a first tactile feedback signal to only the center touch position (for example, the position of a middle finger) among the three touch positions, and in order to present the object direction in the lower direction, it is also good to present a vibration of a second tactile feedback signal to only the center touch position (for example, the position of a middle finger) among the three touch positions.

Figure 7B:
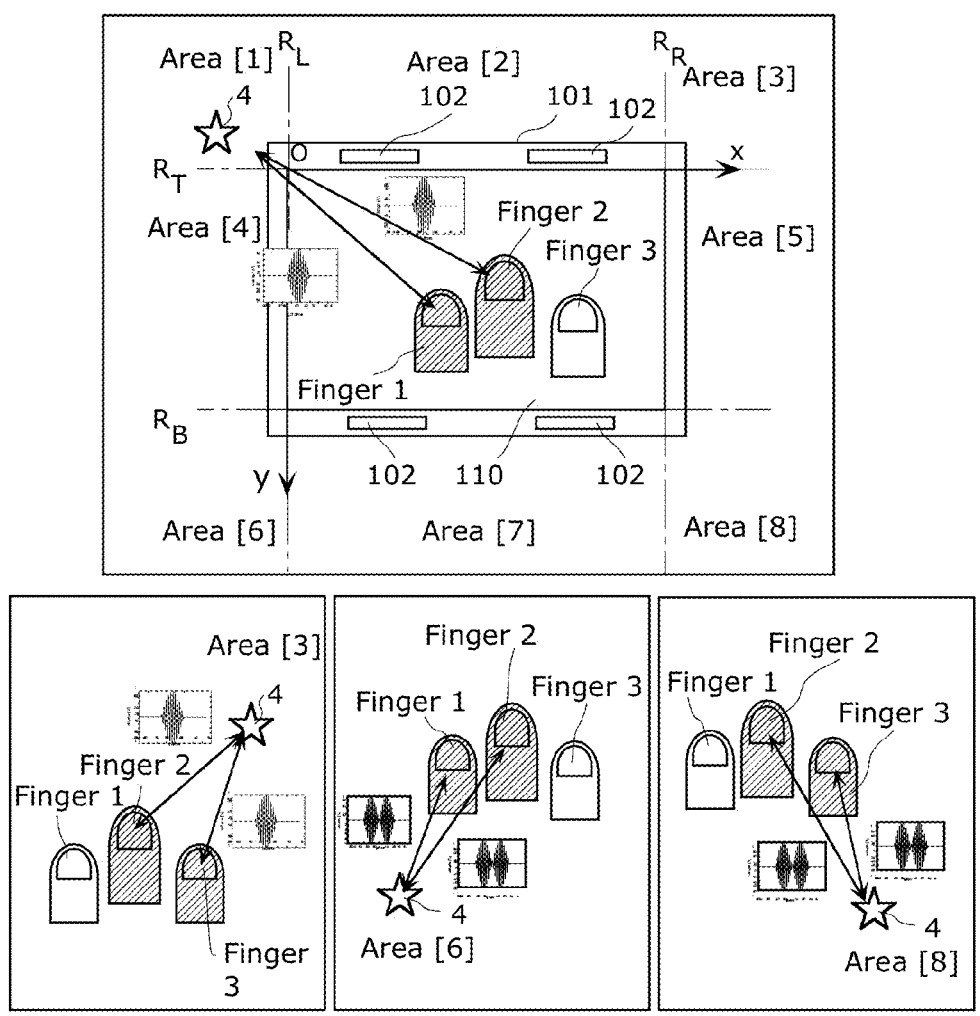
[FIG. 7B]

In addition, another variation of Embodiment 1 is provided taking an example where the panel 101 is touched with three fingers as shown in FIG. 7B. In this case, it is possible to present vibrations to respectively corresponding two touch positions as a set, and thereby to present, using the vibrations, any one of the diagonal directions (an area [1], an area [3], an area [6], and an area [8], in addition to the upper direction (an area [2]), the lower direction (an area [7]), the left direction (an area [4]), and the right direction (an area [5]).

As another conceivable variation of Embodiment 1, it is possible to guide one or more fingers to one or more buttons within a display area of a display screen, not only to an object present outside the display area.

This embodiment is described taking the example of presenting the object direction on the two-dimensional plane including the touch panel plane. However, it is also possible to present, using a vibration, the direction of a destination in an outdoor environment by combining the present disclosure with a gyroscope or a GPS.

[Explanation of Examples of Structures of Multi-Point Simultaneous Vibration Control Units 107 and Operations Performed Thereby]

Figure 8:
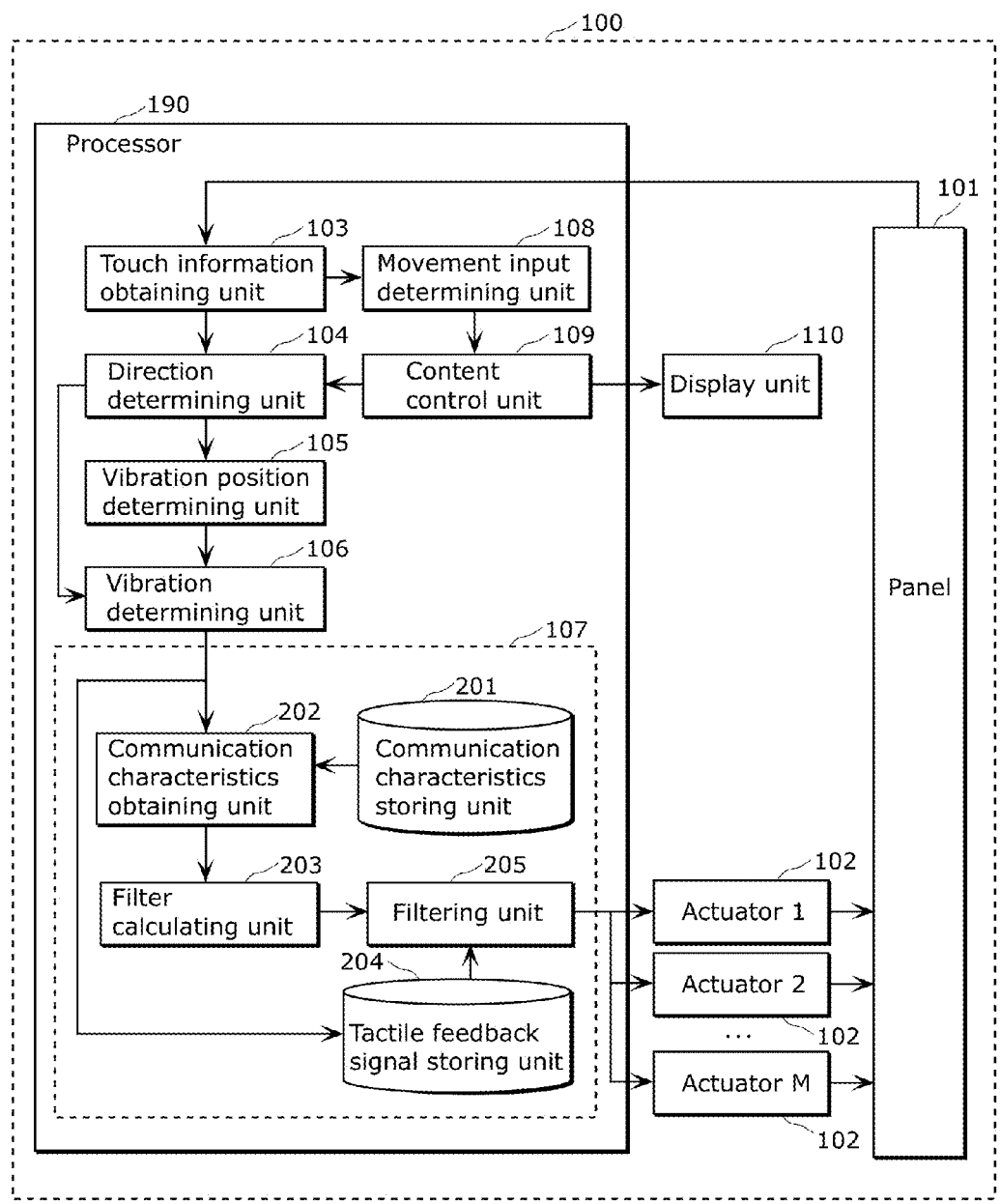
[FIG. 8]

Here are descriptions of the structure of the multi-point simultaneous vibration control unit 107 which is a structural element of Embodiment 1 and operations performed thereby in Step S106. FIG. 8 is a block diagram of a detailed structure of the multi-point simultaneous vibration control unit 107. The multi-point simultaneous vibration control unit 107 in this embodiment includes a communication characteristics storing unit 201, a communication characteristics obtaining unit 202, a filtering unit 203, a tactile feedback signal storing unit 204, and a filter calculating unit 205. Each of the structural elements and the operations are described below.

[Communication Characteristics Storing Unit 201]

The communication characteristics storing unit 201 is, for example, a hard disk or a semiconductor memory. The communication characteristics storing unit 201 stores communication characteristics from actuators 102 to respectively corresponding points on the panel 101. In other words, the communication characteristics storing unit 201 stores the communication characteristics related to combinations of the positions on the panel 101 and the actuators 102 in such a manner that the positions and the actuators 102 are associated with each other.

A communication characteristic shows the relationship between an input and an output in the system. Here, a driving signal for each of the actuators corresponds to the input, and a vibration at one point on the panel corresponds to the output. In general, a communication characteristic $G(\omega)$ is presented as a ratio ($G(\omega)=Y(\omega)/X(\omega)$) of an output $Y(\omega)$ with respect to an input $X(\omega)$ to the system. For example, when the input $X(\omega)$ is an impulse ($X(\omega)=1$), the communication characteristic $G(\omega)$ matches the output $Y(\omega)$ (an impulse response).

For this reason, in this embodiment, the communication characteristics storing unit 201 stores, as communication characteristics, impulse responses from the actuators 102 to the points on the panel 101. Here, the impulse responses may be presented in the time domain, or in the frequency domain. In other words, the communication characteristics storing unit 201 may store the temporal waveforms or spectra of the impulse responses.

Here, the respective points on the panel 101 may be, for example, any representative points (such as centers or the centers of gravity) of the segments on the panel 101. The segments are obtained by, for example, dividing the whole display area of the panel 101 in a lattice shape by the unit of 10 mm. Here, the shape of the segments does not always need to be rectangular, and other shapes are possible. In addition, all the segments do not need to have the same size. For example, the segments have different sizes depending on the positions on the panel 101.

Here, it is possible to increase a resolution for presenting a tactile feedback more significantly as the sizes of the segments are smaller (in other words, the number of segments is larger), resulting in an increase in the memory capacity requirements for storing the communication characters. In other words, the resolution and the memory capacity are in a trade-off relationship. Thus, the size(s) of the segment areas may be determined based on the required resolution or the allowed memory capacity.

Hereinafter, communication characteristics stored in the communication characteristics storing unit 201 are described in detail.

Here, descriptions are given assuming that the communication characteristics storing unit 201 stores M×N communication characteristics from M actuators 102 (A1, A2, ..., AM) to N positions (P1 (x1, y1), P2 (x2, y2), ..., PN (xN, yN)). Here, M is an integer larger than or equal to 2, and N is an integer larger than or equal to 2.

Figure 9:
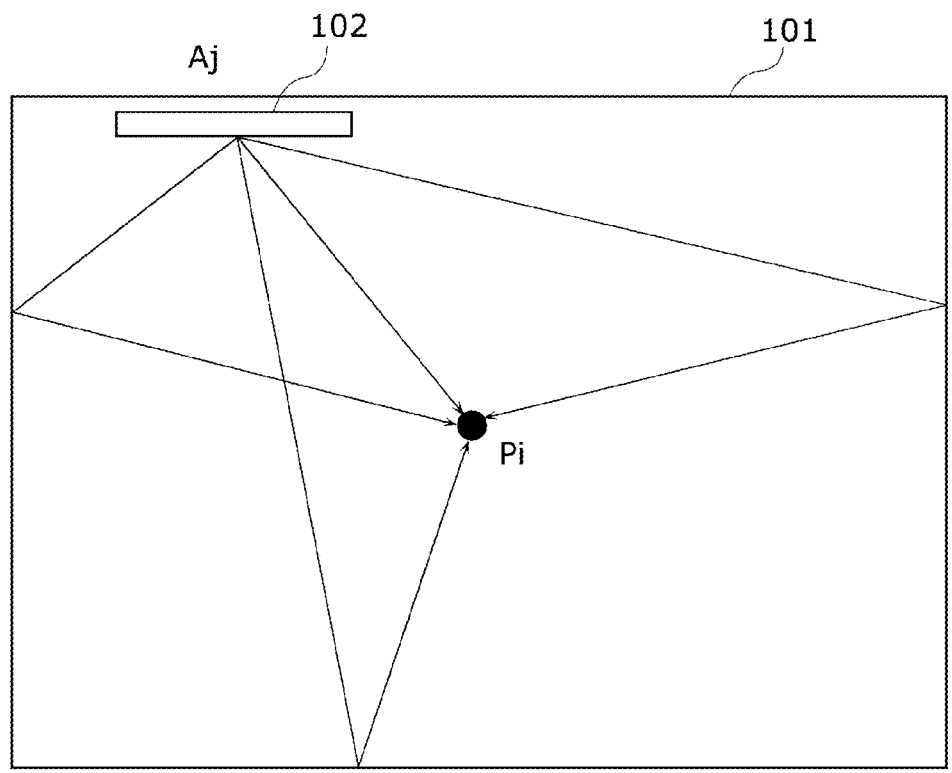
[FIG. 9]

FIG. 9 shows paths through which a vibration is communicated from an actuator 102 to a certain position on the panel 101.

As shown in FIG. 9, a vibration at a position Pi is a vibration obtained by synthesizing a vibration that directly reaches from an actuator Aj to the position i(xi, yi) and a vibration that reaches the position Pi(xi, yi) after being reflected at the end of the panel 101. Accordingly, the communication characteristics include communication characteristics of all the paths from the actuator Aj to the position Pi on the panel.

Here, the communication characteristics may be presented in the time domain or in the frequency domain. The communication characteristics presented in the time domain and the communication characteristics presented in the frequency domain are equivalent to each other, and thus can be exchanged.

The communication characteristics from the actuator Aj to the position Pi(xi, yi) can be obtained by, for example, measuring a vibration (an impulse response) at the position Pi(xi, yi) at the time of input of the impulse to the actuator Aj. The impulse response can fully present the characteristics of the system from the actuator Aj to the position Pi(xi, yi). For this reason, impulse responses are used as communication characteristics in this embodiment.

In general, when an impulse is directly applied, the SN ratio of the impulse response tends to be low because the duration time of the impulse is very short. For this reason, it is also good to measure the impulse response using a Time Stretched Pulse (TSP) instead of the impulse. In this way, it is possible to obtain an impulse response having a high SN ratio as a communication characteristic. Hereinafter, a description is given of a method for measuring an impulse response using a TSP.

Figure 10A:
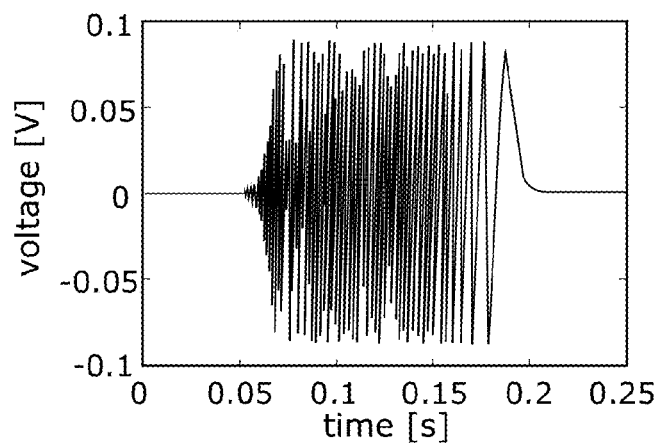
[FIG. 10A]

As shown in Expression (3), a TSP is a signal obtained by changing the phase of the impulse in proportion to the square of the frequency so that the signal has a stretched time axis longer than that of the impulse. FIG. 10A is an illustration of an example of a TSP.

[Math. 3]

$$H(n) = \exp(jkn^2) \quad (3)$$
$$0 \le n \le \frac{N}{2}$$
$$H(n) = H^*(N - n)$$
$$\frac{N}{2} + 1 \le n \le N$$

In Expression (3), H(n) denotes a TSP in the frequency domain, j denotes an imaginary number unit (a square of −1), k denotes a constant indicating the degree of stretch, n denotes a discrete frequency unit, and H* denotes a conjugate of H.

Figure 10B:
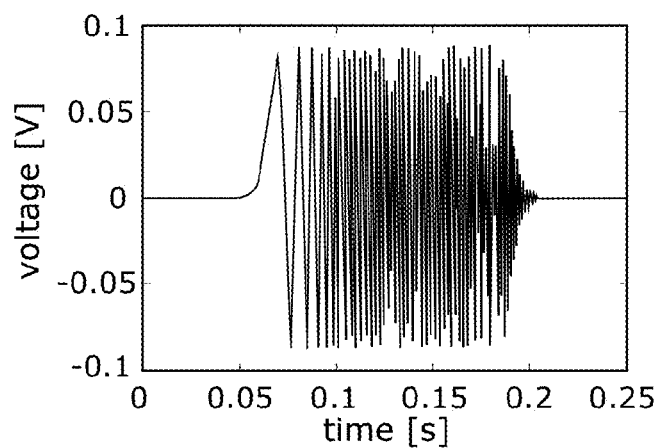
[FIG. 10B]

Using the signal obtained by performing an inverse Fourier transform on the TSP shown in Expression (3), the actuator Aj is driven and a vibration (hereinafter referred to as a "TSP response") at the position Pi(xi, yi) on the panel 101 is measured. There is no restriction on measurement methods. For example, a Doppler shift gage can be used to measure a vibration (TSP response). FIG. 10B is an illustration of an example of the TSP response.

Using the measured TSP impulse, an impulse response is calculated. More specifically, the impulse response is derived by performing a convolution operation using an inverse function of the TSP shown in Expression (2).

[Math. 4]

$$H^{-1}(n) = \exp(-jkn^2) \quad (4)$$
$$0 \le n \le \frac{N}{2}$$
$$H^{-1}(n) = H^*(N - n)$$
$$\frac{N}{2} + 1 \le n \le N$$

Figure 10C:
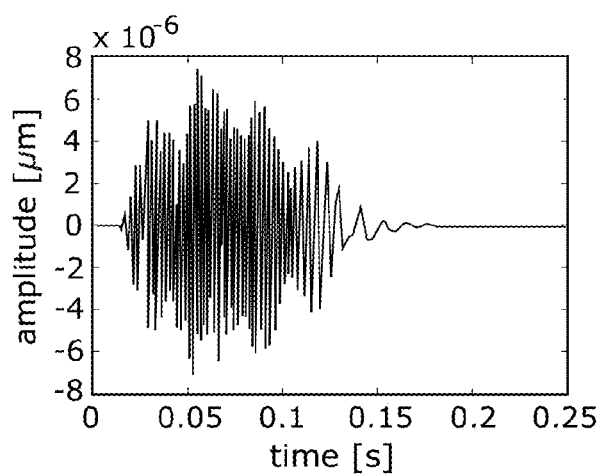
[FIG. 10C]
Figure 10D:
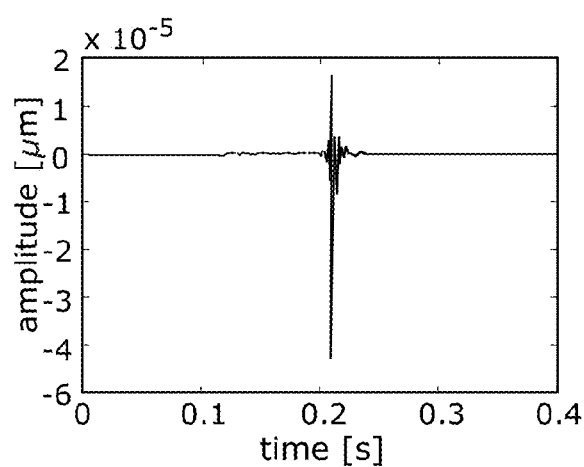
[FIG. 10D]

In Expression (4), H−1(n) shows an inverse function of the TSP. FIG. 10C shows an example of the inverse function of the TSP. In addition, FIG. 10D shows an example of an impulse response calculated from the TSP response in FIG. 10B.

As described above, using the TSP, the impulse response from the actuator Aj to the position Pi(xi, yi) is measured. M×N communication characteristics are obtained by performing the aforementioned measurement for each of the combinations of M actuators 102 (A1, A2, ..., AM) and N positions (P1(x1, y1), P2 (x2, y2), ..., PN (xN, yN)). The M×N communication characteristics obtained in this way are stored in the communication characteristics storing unit 201.

It is to be noted that the aforementioned method for measuring communication characteristics is a non-limiting example. For example, it is also good to measure communication characteristics using M-series signals. For example, it is also good to measure communication characteristics using Gaussian random numbers.

[Communication Characteristics Obtaining Unit 202]

The communication characteristics obtaining unit 202 obtains communication characteristics corresponding to touch positions obtained by the touch information obtaining unit 103 from among the communication characteristics stored in the communication characteristics storing unit 201. In other words, the communication characteristics obtaining unit 202 reads out the communication characteristics from the actuators 102 to the touch positions from the communication characteristics storing unit 201.

[Filter Calculating Unit 203]

The filter calculating unit 203 is an example of a filter obtaining unit. The filter calculating unit 203 obtains a filter for generating desired driving signals by performing filtering on arbitrary tactile feedback signals. Here, the desired signals are signals for driving the actuators 102 so that the panel 101 vibrates according to an arbitrary tactile feedback signal at a first touch position at which a vibration is to be presented and the panel 101 does not vibrate at a second touch position at which the vibration is not to be presented.

In other words, using the communication characteristics obtained by the communication characteristics obtaining unit 202, the filter calculating unit 203 calculates a filter for presenting a tactile feedback only at the first touch position and not presenting the tactile feedback at the other one or more second touch positions (touch positions at which the vibration is not presented) among the touch positions obtained by the touch information obtaining unit 103. The filter calculation method is described in detail later.

[Tactile Feedback Signal Storing Unit 204]

The tactile feedback signal storing unit 204 is, for example, a hard disk or a semiconductor memory. The tactile feedback signal storing unit 204 stores tactile feedback signals generated by the vibration determining unit 106. Each of FIGS. 7A and 7B shows exemplary tactile feedback signals.

The tactile feedback signals may be any signals which can provide tactile feedbacks to a user, and may be determined, for example, based on vibration characteristics of the panel 101. More specifically, the tactile feedback signals may be, for example, signals having a resonance or a near-resonance frequency of the panel 101. In this way, it is possible to increase the energy efficiency.

In this embodiment, the tactile feedback signals are generated on-line based on setting values of setting information by the vibration determining unit 106. The generated signals are stored in the tactile feedback signal storing unit 204, and the driving signals for the actuators 102 are generated by the filtering unit 205. It is to be noted that the vibration determining unit 106 may be configured to store, in advance, tactile feedback signals according to the setting values of the setting information as shown in FIG. 7A and FIG. 7B and to select some of the tactile feedback signals based on the setting values.

[Filtering Unit 205]

The filtering unit 205 generates driving signals for driving the actuators 102 by performing a filtering process (filtering) the tactile feedback signals stored in the tactile feedback signal storing unit 204 using a filter for the actuators calculated by the filter calculating unit 203.

Each of the actuators 102 selectively vibrates or does not vibrate the panel 101 according to the driving signal generated for the actuator 102 by the filtering unit 205 in this way. As a result, a vibration based on a tactile feedback signal is generated at only the first touch position among the touch positions, and the vibration is not presented at the second touch position. In this way, the multi-point simultaneous vibration control unit 107 makes it possible to present a tactile feedback to the user at the vibration position and not to present the tactile feedback at the second touch position.

[Operations]

Figure 11:
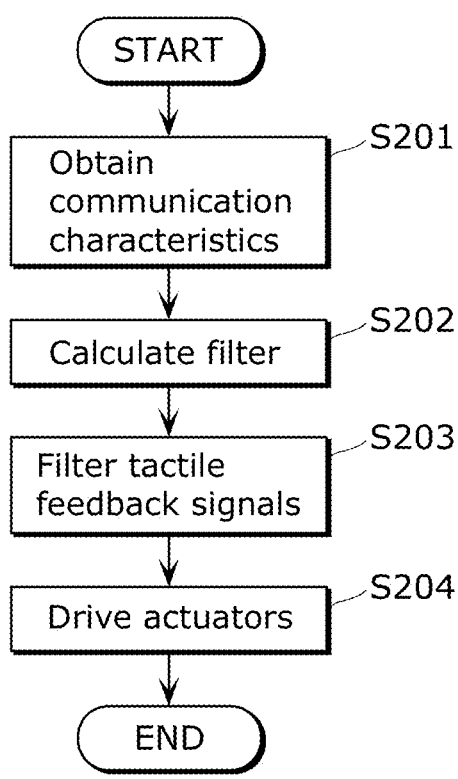
[FIG. 11]
Figure 12:
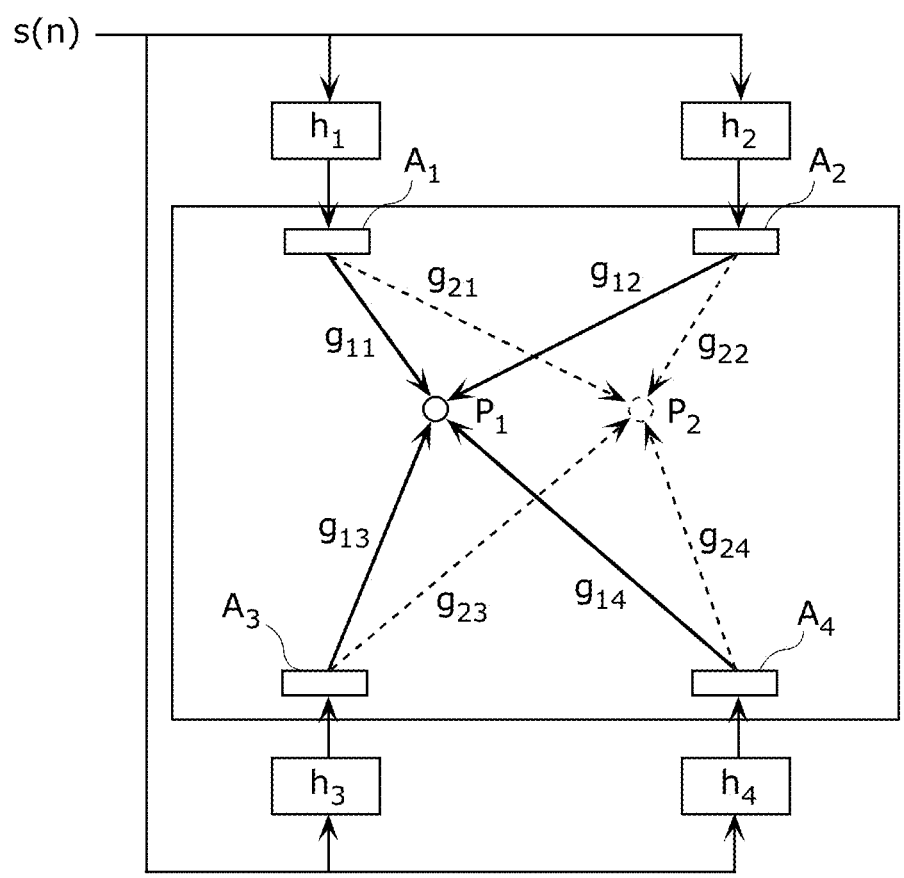
[FIG. 12]

Next, detailed descriptions are given of operations performed by the respective structural elements of the multi-point simultaneous vibration control unit 107 configured as described above. FIG. 11 is a flowchart of operations performed by the tactile/haptic feedback touch panel apparatus 100 according to Embodiment 1. FIG. 12 is a flowchart of operations performed by the tactile/haptic feedback touch panel apparatus 100 according to Embodiment 1.

(Step S201: Obtainment of Communication Characteristics)

Next, the communication characteristics obtaining unit 202 obtains, from the communication characteristics storing unit 201, the communication characteristics corresponding to the first and second touch positions determined by the vibration position determining unit 105. For example, as shown in FIG. 12, the communication characteristics obtaining unit 202 reads out, from the communication characteristics storing unit 201, the communication characteristics g11, g12, g13, and g14 from the actuators A1, A2, A3, and A4 to the touch position P1 and the communication characteristics g21, g22, g23, and g24 from the actuators A1, A2, A3, and A4 to the touch position P2. Here, for example, the first touch position (presentation position) and the second touch position (non-presentation position) are determined to be P1 and P2, respectively.

(Step S202: Calculation of Filter)

Next, the filter calculating unit 203 calculates a filter for presenting a tactile feedback at the presentation position and not presenting the tactile feedback at the non-presentation position. More specifically, the filter calculating unit 203 calculates the filter using the communication characters from each actuator 102 to the presentation position and the communication characters from each actuator 102 to the non-presentation position. For example, the filter calculating unit 203 calculates the filter for presenting the tactile feedback at the touch position P1 and not presenting the tactile feedback at the touch position P2 using the communication characteristics g11, g12, g13, g14, g21, g22, g23, and g24.

A specific example of a filter calculating method is shown below.

Here, a communication characteristic (an impulse response) gij from an actuator Aj to a touch position Pi is shown by Expression (5). In addition, a filter hj for generating a driving signal for the actuator Aj is shown by Expression (6). In addition, a response (output) di at the touch position Pi corresponding to each of the actuators A1 to AM is shown by Expression (7).

[Math. 5]

$$g_{ij}=[g_{ij}(0),g_{ij}(1),\ldots,g_{ij}(L_g)]^T \quad (5)$$

[Math. 6]

$$h_j=[h_j(0),h_j(1),\ldots,h_j(L)]^T \quad (6)$$

[Math. 7]

$$d_i=[d_i(0),d_i(1),\ldots,d_i(L_g+L)]^T \quad (7)$$

In Expression (5), Lg denotes the length of the impulse response. In Expression (6), L denotes the length of the filter (filter length). A longer filter length enables finer control.

Here, a consideration is made as to the relationship between (i) the inputs to the actuators A1 to AM and filters h1 to hM and (ii) the response di at the touch position Pi. The response to the actuator Aj at the touch position Pi is calculated using a convolution operation of the filter hj and the communication characteristic gij. By mixing the response to the input to the actuator Aj at the touch position Pi with the responses to the inputs to all the other actuators Aj at the touch position Pi, it is possible to calculate a response di to the inputs to all the actuators A1 to AM at the touch position. In other words, it is possible to present the response di according to Expression (8) using a filter hj and a communication characteristic gij.

[Math. 8]

$$D = GH \quad (8)$$

$$D = \begin{bmatrix} d_1(0) \\ d_1(1) \\ \vdots \\ — \\ \vdots \\ — \\ d_N(0) \\ d_N(1) \\ \vdots \end{bmatrix}$$

-continued $$G = \begin{bmatrix} G_{11} & G_{12} & \cdots & G_{1M} \\ G_{21} & G_{22} & \cdots & G_{2M} \\ \vdots & \vdots & \ddots & \vdots \\ G_{N1} & G_{N2} & \cdots & G_{NM} \end{bmatrix}$$

$$G_{ij} = \begin{bmatrix} g_{ij}(0) & 0 & \cdots & 0 & 0 \\ g_{ij}(1) & g_{ij}(0) & \cdots & 0 & 0 \\ g_{ij}(2) & g_{ij}(1) & \cdots & 0 & 0 \\ \vdots & \vdots & \ddots & \vdots & \vdots \\ g_{ij}(L_g) & g_{ij}(L_g-1) & \cdots & g_{ij}(0) & 0 \\ 0 & g_{ij}(L_g) & \cdots & g_{ij}(1) & g_{ij}(0) \\ \vdots & \vdots & \ddots & \vdots & \vdots \\ 0 & 0 & \cdots & 0 & g_{ij}(L_g) \end{bmatrix}$$

$$H = \begin{bmatrix} H_1 \\ H_2 \\ \vdots \\ H_M \end{bmatrix} = \begin{bmatrix} h_1(0) \\ h_1(1) \\ \vdots \\ \overline{\phantom{xx}} \\ \vdots \\ \overline{\phantom{xx}} \\ h_M(0) \\ h_M(1) \\ \vdots \end{bmatrix}$$

As shown in Expression (8), the responses d1 to dN to the actuators A1 to AM at the touch positions P1 to PN are presented as a sum of results of the convolution operations of the communication characteristic gij from each actuator Aj to the touch position Pi and a filter hj to be calculated.

Here, it is possible to obtain a desired filter by calculating a filter hj with which only the response dk at the touch position Pk(0<k≤N) among the touch positions P1 to PN becomes the impulse (dk(0)=1, dk(1)=0, dk(2)=0, ..., dk(M)=0) and the other response(s) at the touch position Pl(0<l≤N, l≠k) becomes zero (d10)=0, d1(1)=0, d1(2)=0, ..., d1(M)=0). In other words, by filtering arbitrary tactile feedback signals using the filter hj calculated in this way, it is possible to generate a driving signal for presenting a tactile feedback only at the touch position Pk and a driving signal for not presenting the tactile feedback at the other touch position Pl(l≠k).

For this reason, the filter calculating unit 203 calculates the filter so that the impulse is shown by the sum of the results of convolution operations of the communication characteristic from each actuator 102 to the presentation position and the filter in the time domain, and zero is shown by the sum of the results of convolution operations of the communication characteristic from each actuator 102 to the non-presentation position and the filter in the time domain.

The aforementioned filter calculating method is a non-limiting example. By calculating a generalized inverse matrix G*, it is also possible to calculate a filter as shown Expression (9). In other words, it is possible to calculate H denoting a desired filter, from the generalized inverse matrix G* of G and D denoting the impulse.

[Math. 9]

$$H = G^* D \quad (9)$$

In general, Expression (9) can be solved when the number (M) of actuators is larger than or equal to the number (N) of touch positions. In order to surely solve Expression (9) for a combination of arbitrary touch positions, it is desirable that the communication characteristics gij from the actuators 102 do not have the same zero point at each of the touch positions. For example, when the number of touch positions is two, it is possible to arrange the actuators 102 so that they have different communication characteristics at arbitrary two positions by arranging the actuators 102 two by two at each end of the long sides of the panel 101 as shown in FIG. 12.

Here, a zero point is a frequency at which the level of communication characteristic becomes 0 or becomes close to 0 in the frequency domain. In other words, even when an input includes frequency components at the zero point, almost all of the frequency components are not included in the resulting output.

Accordingly, when the communication characteristics from all the actuators 102 to a given position have the zero point at the same frequency, the panel 101 does not vibrate at the position at the frequency despite the input of any signal. In other words, it is impossible to control vibration at the particular frequency. Accordingly, at each of frequencies to be control targets, it is desirable that the communication characteristics from at least one of the actuators 102 include a characteristic other than the zero point.

Figure 13:
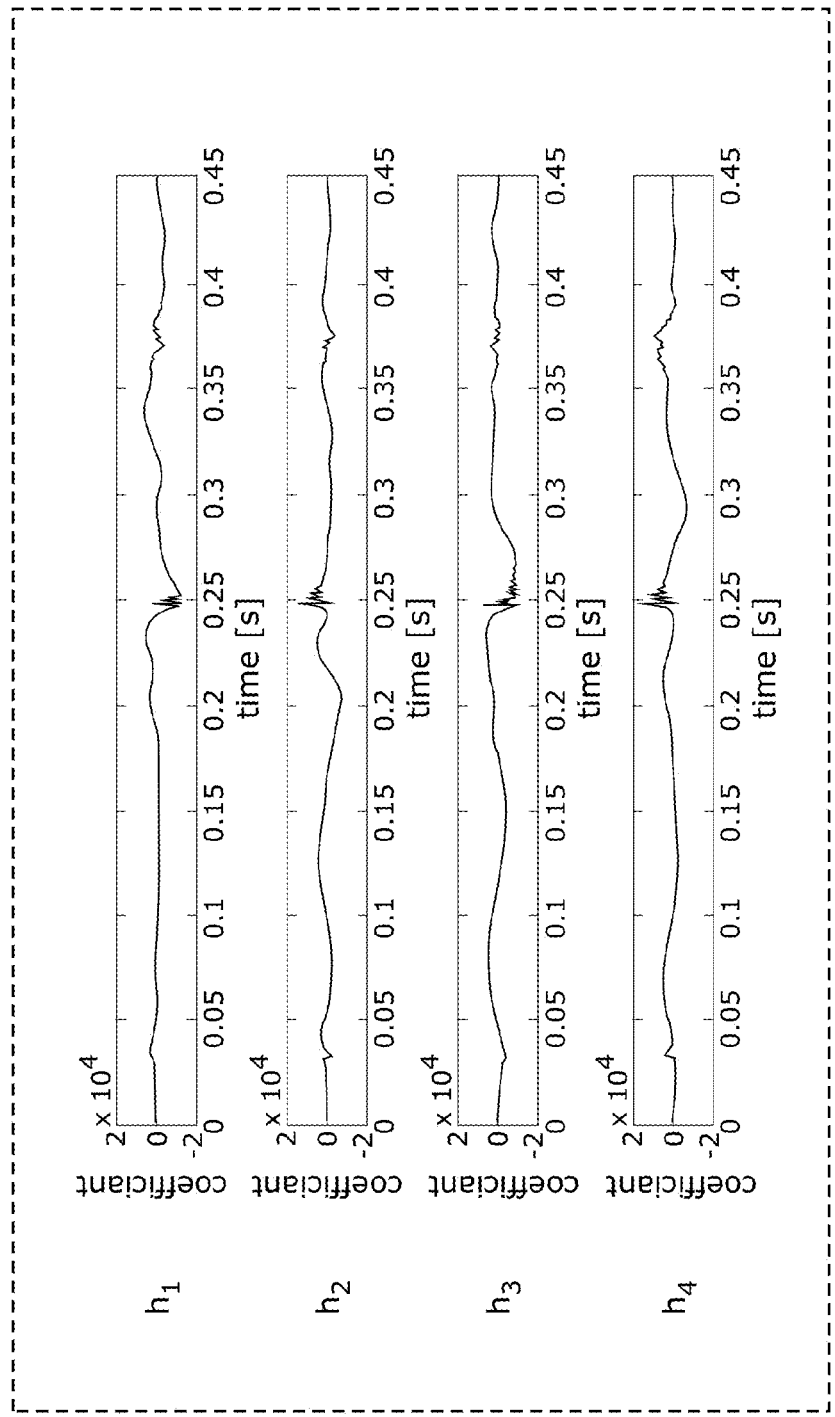
[FIG. 13]

FIG. 13 shows examples of filters. More specifically, FIG. 13 shows the filters calculated when the touch position P1 is determined to be the presentation position in FIG. 12.

(Step S203: Filtering Tactile Feedback Signals)

Next, the filtering unit 205 generates driving signals for driving the actuators 102 by filtering the tactile feedback signals stored in the tactile feedback signal storing unit 204 using the filter calculated in Step S202. More specifically, the filtering unit 205 generates a driving signal for the actuator Aj by performing a convolution operation of a tactile feedback signal S (n) and a filter hj (n).

The following description is given taking an example of filtering, as the tactile feedback signal S (n), the tactile feedback signal shown in FIG. 7A determined according to a setting value by the vibration determining unit 106, stored in the tactile feedback signal storing unit 204, and to be presented at the touch position P1.

Here, filtering is described in detail.

The filtering unit 205 generates a driving signal uj(n) for driving the actuator Aj as shown in Expression (10). In other words, the filtering unit 205 generates a driving signal uj(n) by performing a convolution operation of the tactile feedback signal s (n) and the filter hj (n) calculated by the filter calculating unit 203.

[Math. 10]

$$u_j(n) = s(n) \otimes h_j(n) = \Sigma s(n-k) h_j(k) \quad (10)$$

Figure 14:
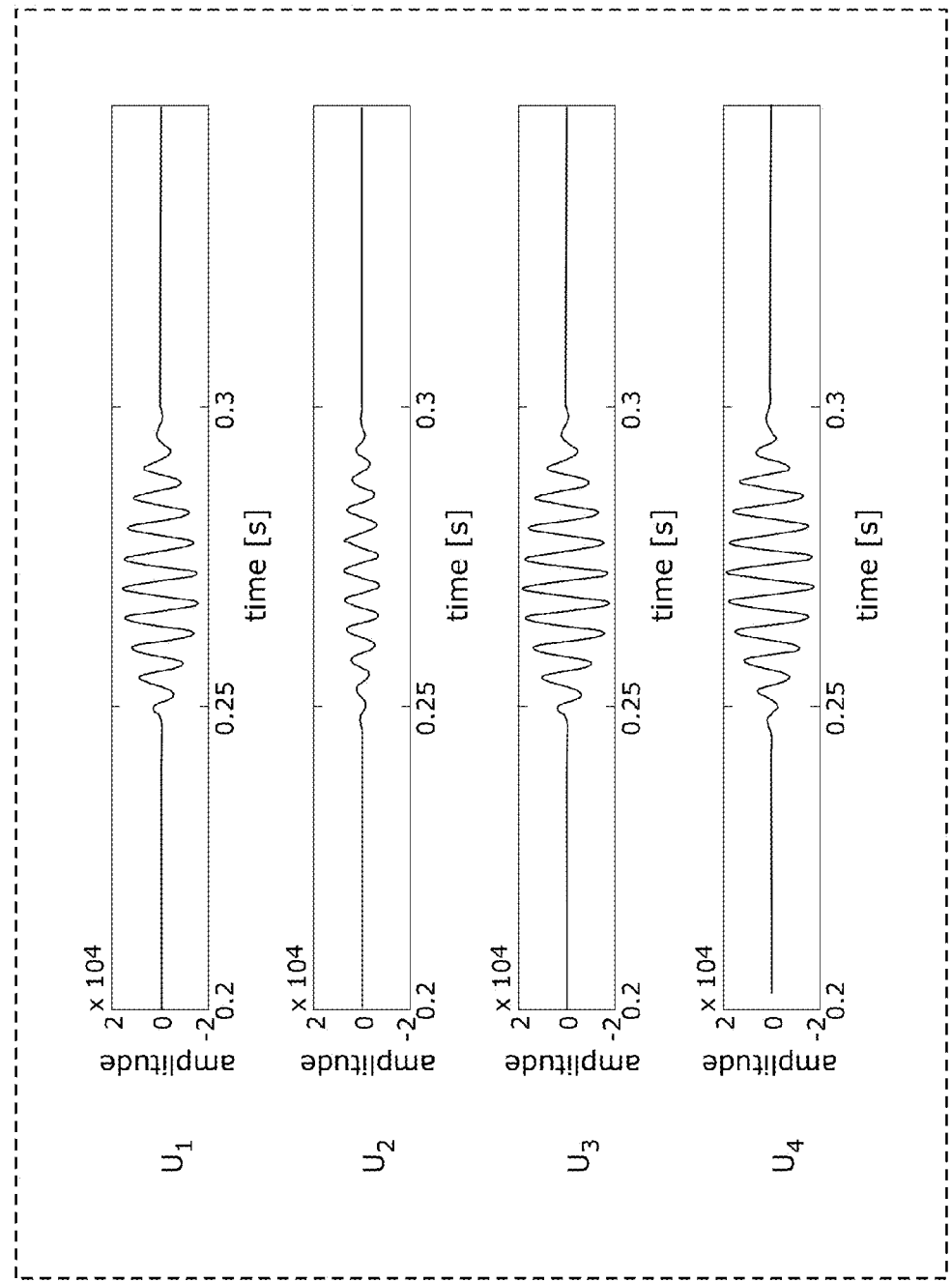
[FIG. 14]

FIG. 14 shows examples of driving signals. In other words, FIG. 14 shows the examples of the driving signals generated by the filtering unit 205 according to Expression (10). More specifically, FIG. 14 shows the driving signals generated by processing the tactile feedback signals shown in FIG. 7A using the filters shown in FIG. 13.

(Step S204: Driving of Actuators)

Next, the actuator Aj is driven using the driving signal uj(n) generated in Step S203. In other words, the actuator Aj drives the panel 101 according to the driving signal uj(n).

It is to be noted here that a driving signal having a high voltage may be required depending on the kind of the actuator. In such a case, the actuator 102 may have am amplifier for amplifying the driving signal.

Figure 15:
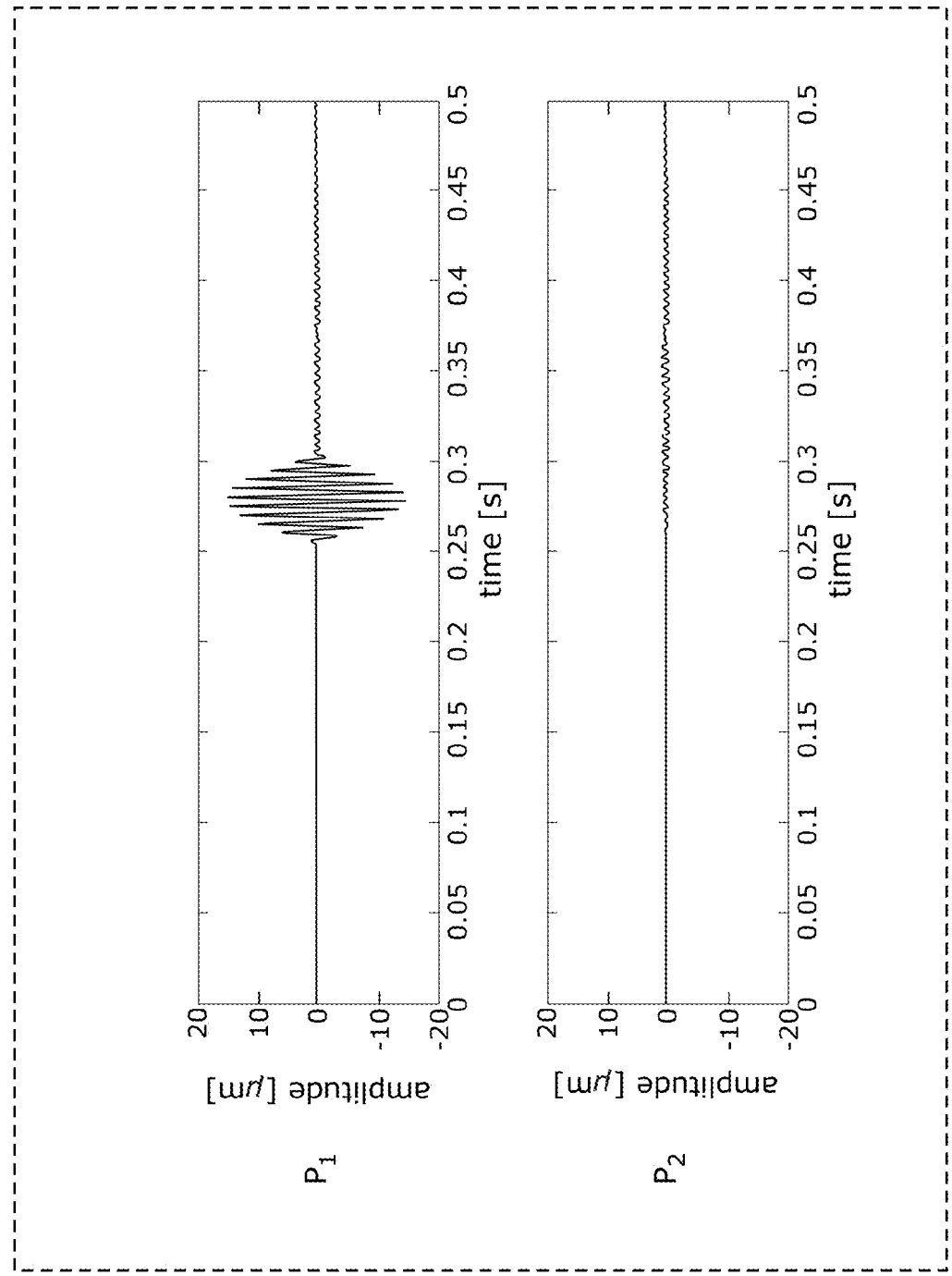
[FIG. 15]

FIG. 15 shows experimental results of vibrations at the touch positions on the panel 101. More specifically, FIG. 15 shows vibrations at the touch positions P1 and P2 on the panel 101 when the actuators 102 are driven using the driving signals shown in FIG. 15.

At the touch position P1, the difference between vibration peaks (hereinafter referred to as "amplitude strength") is about 30 μm, which shows a strong vibration. On the other hand, the amplitude strength at the touch position P2 is 1 μm, which shows that the vibration is too weak to be recognized by a user.

FIG. 15 shows only the vibration characteristics at the touch positions P1 and P2, but the part other than the touch positions P1 and P2 also vibrates. However, the part other than the touch positions P1 and P2 is not touched by the user, and thus no tactile feedback is presented to the user despite the existence of the vibration.

The multi-point simultaneous vibration control unit 107 according to Embodiment 1 configured as described above and performs the aforementioned operations makes it possible to present the tactile feedback at the first touch position at which the vibration is presented and not to present the tactile feedback at the second touch position at which the vibration is not presented. Accordingly, it is possible to present a tactile feedback only to a touch input for which a tactile feedback needs to be presented among the touch positions.

In Embodiment 1, the filters are calculated in the time domain. However, a multi-point simultaneous vibration control unit 107 according to Variation 1 can naturally reduce processing load by calculating filters in the frequency domain. In addition, the multi-point simultaneous vibration control unit 107 according to Variation 1 can further reduce the processing load by performing the processing within a frequency range in which a user can recognize a tactile feedback.

In addition, a multi-point simultaneous vibration control unit 107 according to Variation 2 can naturally reduce processing load by performing the processes up to the filter calculation process off-line instead of on-line.

In addition, a multi-point simultaneous vibration control unit 107 according to Variation 3 can further reduce the processing load by calculating and storing driving signals for all the combination patterns of touch positions in advance and selecting some of the driving signals according to the combination pattern of some of the touch positions, and can present different vibrations for the respective touch positions even in the case of using a computer resource having a lower processing capability.

Furthermore, a multi-point simultaneous vibration control unit 107 according to Variation 4 can drive an actuator 102 using a driving signal obtained by mixing (i) a driving signal 1 for presenting a vibration shown in FIG. 4A at a first touch position P1 and not presenting the vibration shown in FIG. 4A at a second touch position P2 and (ii) a driving signal 2 for presenting a vibration shown in FIG. 4B at P2 regarded as a first touch position and not presenting the vibration shown in FIG. 4A at P1 regarded as a second touch position.

The structures of the aforementioned multi-point simultaneous vibration control units 109 and operations performed thereby are examples, and thus other structures and operations are possible. For example, the panel may include a flexible display screen, or may include actuators which locally vibrate the surface thereof.

Embodiment 2

In the above-described manner, it is possible to allow, using a vibration, a user to recognize the direction of an object included in a content item 13 such as a map or a document outside a display area and allow the user to scroll the content item 13 using one or more fingers. At this time, in this modified embodiment, another vibration is added at the touch position when the object enters the display area from the outside of the display area (or a touch operation is performed after the entrance). More specifically, it is possible to vibrate actuators 102 using driving signals which provide vibrations having larger amplitudes. Alternatively, vibrations may be added to all the touching fingers, or the number of stimuli may be increased. In this way, the tactile feedback allows the user to recognize the entrance of the object into the display area when the user performs a scroll operation without focusing on the display screen. For example, it is possible to prevent the user from continuing the scroll operation even after the object enters the display area until the object goes outside the display area without the recognition of the entrance.

Embodiment 3

In the above-described manner, it is possible to allow, using a vibration, a user to recognize the direction of an object included in a content item 13 such as a map or a document outside a display area and allow the user to scroll the content item 13 with one or more fingers. At this time, in this modified embodiment, the magnitude or kind of a vibration is modified according to the distance between an object and a display area boundary (or a touch position). More specifically, it is possible to allow a user to recognize the distance between the object and the display area by increasing (or decreasing) the magnitude of the vibration as a tactile feedback or increasing (or decreasing) the number of stimuli of the vibration as the tactile feedback as the object is closer to the display area. In this way, the tactile feedback allows the user to recognize the distance from the display area in addition to the direction of the object. Thus, the user can make preparations for stopping the scroll operation. In this way, with the tactile/haptic feedback touch panel apparatus according to Embodiment 1, it is possible to present the user with the direction in which the target object is present, and to efficiently achieve operations for making a movement on the content item so as to re-display the object within the display area.

In Embodiment 1, it is desirable that the actuators 102 be stopped and the panel 101 be not vibrated when no touch position is detected. However, it is good to present a vibration as a tactile feedback indicating the state of an input or apparatus after the touch position is left.

In Embodiment 1, the detection orders, the movement directions, and the spatial orders are calculated based on the time-series information of the touch positions. However, the calculation methods are non-limiting examples, and other calculation methods are possible. For example, it is possible to calculate these information items based also on the number of touches, touch numbers, and touch events such as touch start events, touch continuation events, touch end events all are notified from the touch panel driver to the operating system.

In addition, Embodiment 1 is described taking the non-limiting example where vibrations are presented when the touch positions are detected, when the touch positions are moved, and when the touch positions are moved and then stopped. However, it is also good to present vibrations when the pressure of a touch is larger than or equal to a predetermined threshold value, when the size of a touch position area touched with a finger is larger than or equal to a predetermined threshold value, or when another multi-touch gesture is detected.

The tactile/haptic feedback touch panel apparatus according to Embodiment 1 allows a user to perform a setting operation on an apparatus when operating the apparatus by touch input without focusing on a touch panel or a touch pad for input. Therefore, the tactile/haptic feedback touch panel apparatus is applicable to systems for use in cars such as car navigation systems because of the needs that users wish to operate their touch remote controllers in hand focusing on content items on the display screen not on the whole display screen as much as possible without focusing on the remote controller. In addition, the tactile/haptic feedback touch panel apparatus can be included in various kinds of apparatuses because the tactile/haptic feedback touch panel apparatus makes it possible to associate setting items and the spatial orders of touch positions and present a vibration at only one or more touch positions corresponding to selected one or more of the setting items, and thereby allows a user to easily recognize the one or more setting items received by the apparatus. For example, the tactile/haptic feedback touch panel apparatus is applicable as tactile/haptic feedback touch panel apparatuses which are operated by touch input using touch panels or touch pads. Examples of the apparatuses include tablet terminals, gaming machines, remote controllers for television receivers, digital cameras, video cameras, personal computers, mobile information terminals, mobile phones, electric backboards, displays for digital signage. In addition, the tactile/haptic feedback touch panel apparatus is applicable as tactile/haptic feedback touch panel apparatuses included in home appliances with touch panels such as washing machines and micro wave ovens, and as tactile/haptic feedback touch panel apparatuses included in apparatuses with touch panels such as mobile phones and tablet devices for controlling home appliances.

The non-limiting exemplary embodiments described above do not limit the scope of the Claims in the present application. Those skilled in the art will readily appreciate that various modifications may be made in these exemplary embodiments and other embodiments may be obtained by arbitrarily combing the structural elements of the embodiments without materially departing from novel teachings and advantages of the subject matter in the attached Claims. Therefore, all such variations and embodiments are also included in the present disclosure.

INDUSTRIAL APPLICABILITY

A tactile/haptic feedback touch panel apparatus according to the present disclosure is applicable for operations by various apparatuses, such as car navigation systems, each including at least one touch input device. For example, the present disclosure is applicable to tactile/haptic feedback touch panel apparatuses such as tablet devices, gaming machines, remote controllers for television receivers, digital cameras, video cameras, personal computers, mobile information terminals, mobile phones, electric backboards, displays for digital signage.

The invention claimed is:

1. A method of controlling a touch panel device, the method comprising:
  detecting a plurality of inputs provided by multi-touch input at or around positions on a touch panel of a display screen;
  detecting a plurality of input positions of the detected inputs in order to display a content item;
  displaying a first part of the content item on a display area of the display screen;
  determining whether an object included in a second part of the content item is present in an outside area of the display area of the display screen, the outside area being an area including the object that is not displayed on the display area of the display screen even though the object is included in the content item; and
  detecting, using a processor, when the object is present in the outside area of the display area of the display screen;
  calculating a distance between each of the plurality of input positions and the object;
  causing a plurality of actuators to present a predetermined vibration at an input position at or around an input position closest to the object in the content item, among the plurality of input positions of inputs provided on the content item, the input position closest to the object being determined based on the distance, and
  preventing the plurality of actuators from presenting the predetermined vibration at an input position farthest from the object in the content item, among the plurality of input positions of inputs provided on the content item.

2. The method according to claim 1,
  wherein the predetermined vibration presented by the plurality of actuators includes one of different vibration methods determined based on the distance between the object and the input position closest to the object.

3. The method according to claim 2,
  wherein the predetermined vibration presented by the plurality of actuator is different when the object present in the second part is in a left or right direction with respect to the display area of the display screen than when the object present in the second part is in an upper or lower direction with respect to the display area.

4. The method according to claim 1, further comprising
  causing the touch panel device to scroll the content item in response to sliding or tapping by a user; and
  causing, using the processor, the plurality of actuators to vibrate the touch panel when the object enters the display area from the second part.

5. A touch panel device, comprising:
  a touch panel for multi-touch input;
  a plurality of actuators that causes the touch panel to vibrate; and
  a processor which:
  detects a plurality of inputs provided by multi-touch input at or around positions on a surface of the touch panel of a display screen;
  detects a plurality of input positions of the detected inputs in order to display a content item;
  displays a first part of the content item on a display area of the display screen;
  determines whether an object included in a second part of the content item is present in an outside area of the display area of the display screen, the outside area being an area including the object that is not displayed on the display area of the display screen even though the object is included in the content item; and
  when the processor determines that the object is present in the outside area of the display area of the display screen:
  calculates a distance between each of the plurality of input positions and the object;
  causes the plurality of actuators to present a predetermined vibration at a position at or around an input position closest to the object in the content item, among the plurality of input positions of inputs provided on the item, the input position closest to the object being determined based on the distance; and
  prevents the plurality of actuators from presenting the predetermined vibration at an input position farthest from the object in the content item, among the plurality of input positions of inputs provided on the content item.

6. The touch panel device according to claim 5,
  wherein the predetermined vibration presented by the plurality of actuators includes one of different vibration methods determined based on the distance between the object and the input position closest to the object.

7. The touch panel device according to claim 5,
wherein the touch panel device scrolls the content item in response to sliding or tapping by a user, and
the processor causes the plurality of actuators to vibrate the touch panel when the object enters the display area from the second part.

8. The touch panel device according to claim 5,
wherein the predetermined vibration presented by the plurality of actuator is different when the object present in the second part is in a left or right direction with respect to the display area than when the object present in second part is in an upper or lower direction with respect to the display area.

9. The touch panel device according to claim 5,
wherein the content item is a map.

10. The touch panel device according to claim 5,
wherein the content item is a map, an electric document, a bookmark, or a Web page.

11. A tactile/haptic feedback touch panel apparatus, comprising:
a panel configured to receive touch input by a user and output a predetermined vibration notifying acceptance of the touch input;
a plurality of actuators which are arranged at different positions on the panel and vibrate the panel;
a touch information obtaining unit configured to obtain touch positions detected simultaneously at the different positions on the panel;
a movement input determining unit configured to calculate movement directions and movement distances of the touch positions detected simultaneously on the panel, based on time-series information of the touch positions;
a display unit configured to display a first part of a content item on a display area of a display screen;
a direction determining unit configured to determine an object direction of an object included in a second part of the content item when the object is present in an outside area of the display area of the display screen, the outside area being an area including the object that is not displayed on the display area of the display screen even though the object is included in the content item;
a distance calculating unit configured to calculate a distance between each of the touch positions and the object;
a vibration position determining unit configured to compare a position of the object and each of the touch positions, and determine (i) a touch position closest to the object as a first touch position at which the plurality of actuators presents the predetermined vibration and (ii) each of one or more touch positions detected simultaneously with the first touch position and as a second touch position at which the plurality of actuators presents the predetermined vibration;
a vibration determining unit configured to determine a tactile feedback signal presenting the predetermined vibration to be presented at the first touch position determined by the vibration position determining unit, based on the object direction determined by the direction determining unit and the distance determined by the distance calculating unit;
a multi-point simultaneous vibration control unit configured to calculate a driving signal for causing each of the actuators to present the predetermined vibration at the first touch position closest to the object in the content item and a driving signal for preventing each of the actuators from presenting the predetermined vibration at the second touch position which is farthest from the object in the content item, and simultaneously perform vibration control adapted to the respective touch positions on the panel by driving the actuators using the calculated driving signals; and
a content control unit configured to perform display control for displaying the content item onto the display area of the display screen by scrolling the content item based on the movement directions and the movement distances of the touch positions calculated by the movement input determining unit.

12. A method performed by a tactile/haptic feedback touch panel apparatus, the method allowing each of a plurality of actuators in the tactile/haptic feedback touch panel apparatus to output a predetermined vibration in response to touch input by a user on a panel in the tactile/haptic feedback touch panel apparatus, the method comprising:
obtaining a plurality of touch positions detected simultaneously at different positions on the panel:
calculating movement directions and movement distances of the touch positions detected simultaneously on the panel, based on time-series information of the touch positions;
displaying a first part of a content item on a display area of a display screen;
determining an object direction of an object in a second part of the content item when the object is present in an outside area of the display area of the display screen, the outside area being an area including the object is not displayed on the display area of the display screen even though the object is included in the content item;
calculating a distance between each of the touch positions and the object;
determining, among the plurality of touch positions, (i) a touch position closest to the object as a first touch position at which the plurality of actuators presents the predetermined vibration and (ii) each of the other one or more touch positions detected simultaneously with the first touch position and as a second touch position at which the plurality of actuators presents the predetermined vibration;
determining a tactile feedback signal representing the predetermined vibration to be presented at the determined first touch position, based on the object direction determined and the distance between each of the touch positions and the object;
driving the actuators so that each of the actuators presents the predetermined vibration at the first touch position closest to the object, and each of the actuators does not present the predetermined vibration at the second touch position which is farthest from the object; and
displaying the content item onto the display area of the display screen by scrolling the content item based on the calculated movement directions and movement distances.

* * * * *